United States Patent
Younes et al.

(10) Patent No.: US 10,599,192 B2
(45) Date of Patent: Mar. 24, 2020

(54) INTERNAL ARCHITECTURE OF A PORTABLE ELECTRONIC DEVICE HAVING PORTS THAT ARE OFFSET FROM ELECTRONIC MODULES

(71) Applicant: Apple Inc., Cupertino, CA (US)

(72) Inventors: Amin M. Younes, Mountain View, CA (US); James G. Horiuchi, San Jose, CA (US); Ryan C. Perkins, San Francisco, CA (US); Brad G. Boozer, Saratoga, CA (US); Christopher M. Werner, San Jose, CA (US); Maegan K. Spencer, La Honda, CA (US); Sherry Tang, Cupertino, CA (US); Eugene H. Fox, San Jose, CA (US); Mark A. Murphy, San Francisco, CA (US); Molly J. Anderson, San Francisco, CA (US); Rico L. Zorkendorfer, San Francisco, CA (US); Baris Ozgen, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/976,768

(22) Filed: May 10, 2018

(65) Prior Publication Data
US 2019/0079564 A1   Mar. 14, 2019

Related U.S. Application Data

(60) Provisional application No. 62/556,777, filed on Sep. 11, 2017.

(51) Int. Cl.
*G06F 1/16* (2006.01)
*H04R 1/02* (2006.01)
(Continued)

(52) U.S. Cl.
CPC .......... *G06F 1/1694* (2013.01); *G04G 21/02* (2013.01); *G06F 1/163* (2013.01); *H04R 1/028* (2013.01); *G01C 5/06* (2013.01); *H04R 2499/11* (2013.01)

(58) Field of Classification Search
CPC ...... G06F 1/163; G06F 1/1613; G06F 1/1626; G06F 1/1628; G06F 1/1694; G06F 1/181–188; G04G 21/02
See application file for complete search history.

(56) References Cited

U.S. PATENT DOCUMENTS

| | | |
|---|---|---|
| 8,490,645 B2 | 7/2013 | Igarashi |
| 2011/0213271 A1* | 9/2011 | Telfort .................. A61B 7/003 600/586 |

(Continued)

*Primary Examiner* — Andrew C Flanders
(74) *Attorney, Agent, or Firm* — Dickinson Wright RLLP

(57) ABSTRACT

This application relates to a portable electronic device including a first sensing module and a second sensing module that are both in communication with a processor. The portable electronic device can include access ports that are formed in the housing, where the first and second sensing modules are capable of receiving an external stimulus by way of the access ports. A plate is positioned in the housing between a wall of the housing and the sensing modules. The plate and the wall define non-linear flow paths between the access ports to the first and second sensing modules. The non-linear flow paths can transmit the external stimulus to cause at least one of the first or second sensing modules to provide a detection signal to the processor that causes a display unit to present a notification that corresponds to the external stimulus.

20 Claims, 10 Drawing Sheets

(51) Int. Cl.
*G04G 21/02* (2010.01)
*G01C 5/06* (2006.01)

(56) References Cited

U.S. PATENT DOCUMENTS

| | | | |
|---|---|---|---|
| 2015/0119758 A1* | 4/2015 | Rogers | A61B 7/04 |
| | | | 600/586 |
| 2016/0106906 A1 | 4/2016 | Buckberry | |
| 2017/0251564 A1* | 8/2017 | Jun | H04M 1/035 |
| 2017/0351221 A1 | 12/2017 | Balti et al. | |
| 2017/0374441 A1 | 12/2017 | Hoekstra et al. | |

* cited by examiner

INTERNAL ARCHITECTURE OF A PORTABLE ELECTRONIC DEVICE HAVING PORTS THAT ARE OFFSET FROM ELECTRONIC MODULES

CROSS-REFERENCE TO RELATED APPLICATIONS

The present application claims the benefit of U.S. Provisional Application No. 62/556,777, entitled "INTERNAL ARCHITECTURE OF A PORTABLE ELECTRONIC DEVICE HAVING PORTS THAT ARE OFFSET FROM ELECTRONIC MODULES," filed Sep. 11, 2017, the content of which is incorporated herein by reference in its entirety for all purposes.

FIELD

The described embodiments relate generally to a portable electronic device having a sensing module (or sensing modules) that is/are capable of detecting a stimulus from an environment external to the portable electronic device by way of an access port (or access ports) that is/are disposed along an enclosure of the portable electronic device. More particularly, the described embodiments relate to an internal architecture of the portable electronic device where the sensing module(s) is/are arranged, within the portable electronic device, in an offset configuration with respect to the location of the access port(s).

BACKGROUND

Due to recent technological advances, a single electronic device can provide a number of different sensing functions that are capable of being executed by a single electronic device. In this regard, a single electronic device can carry a number of different sensors within in an enclosure. However, these different sensors can be highly sensitive to external contaminants (e.g., debris, excess moisture, etc.). The presence of such external contaminants can impair the ability of these different sensors to provide accurate measurements that can be trusted by a user of the electronic device.

As an example, the enclosure can include access ports that lead into a cavity (defined by the enclosure) that enables these sensing modules to receive external stimuli. However, the number of access ports that lead to the sensing modules are dedicated (or exclusive) to each sensing module. Consequently, when an external contaminant (e.g., dust, debris, excess moisture, etc.) becomes ensnared within the access port and/or cavity leading to the sensing modules, these sensing modules are unable to provide accurate measurements of the external environmental activity.

Due in part to design constraints, a manufacturer of these portable electronic devices is generally forced to provide an internal design layout in which the location of the sensing modules in the cavity is aligned with the access ports, thereby forming a straight or linear pathway between the access ports and the sensing modules. In other words, each access ports is aligned and concentric with respect to a detection region of a sensing module. Changes to the internal design layout to, for example, rearrange a position of the sensing module can be difficult, expensive, and time-consuming.

SUMMARY

To cure the foregoing deficiencies, the representative embodiments set forth herein disclose an internal architecture of a portable electronic device having at least one sensing module that is arranged offset from at least one access port that is provided along an enclosure of the portable electronic device.

In one aspect, a wearable electronic device is described. The portable electronic device may include a housing that includes walls that defines an internal volume. The walls may include a wall that includes a first access port and a second access port. The first access port and the second access port may open to the internal volume. The portable electronic device may further include a first sensing module located in the internal volume. The first sensing module may include a first detection region in communication with an environment that is external to the housing. The portable electronic device may further include a second sensing module located in the internal volume. The second sensing module may include a second detection region in communication with the external environment external. In some embodiments, i) the first detection region is offset with respect to the first access port and ii) the second detection region is offset with respect to the second access port, thereby forming a tortuous pathway from the first access port and the second access port to the first detection region and the second detection region, respectively.

In another aspect, a wearable electronic device is described. The portable electronic device may include a housing that includes walls that defines an internal volume. The walls may include a wall that includes an access port that opens to the internal volume. The portable electronic device may further include a sensing module located in the internal volume. The sensing module may include a detection region that is in an offset position, in at least two dimensions, with respect to the access port. The detection region can be in communication with an environment that is external to the housing. The portable electronic device may further include a plate positioned in the internal volume between the wall and the sensing module. The plate may include an opening aligned with the access port and the detection region. In some embodiments, the wall and the plate define a pathway, based on the offset position, from the access port to the detection region.

In another aspect, a wearable electronic device is described. The portable electronic device may include a housing that includes walls that defines an internal volume. The walls may include a wall that includes a first access port and a second access port. The first access port and the second access port may open to the internal volume. The portable electronic device may further include an ambient pressure sensor located in the internal volume. The ambient pressure sensor may include a first detection region that is capable of measuring ambient pressure of an environment external to the housing. The portable electronic device may further include a microphone located in the internal volume. The microphone may include a second detection region that is capable of detecting acoustical energy received from the external environment. The portable electronic device may further include a plate positioned in the internal volume and coupled to the ambient pressure sensor and the microphone. The plate may include a first opening aligned with the first access port and the first detection region. The plate may further include a second opening aligned with the second access port and the second detection region. In some embodiments, the wall and the plate define a tortuous pathway for a stimulus from the environment external to the first detection region and the second detection region.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

Figure 1:
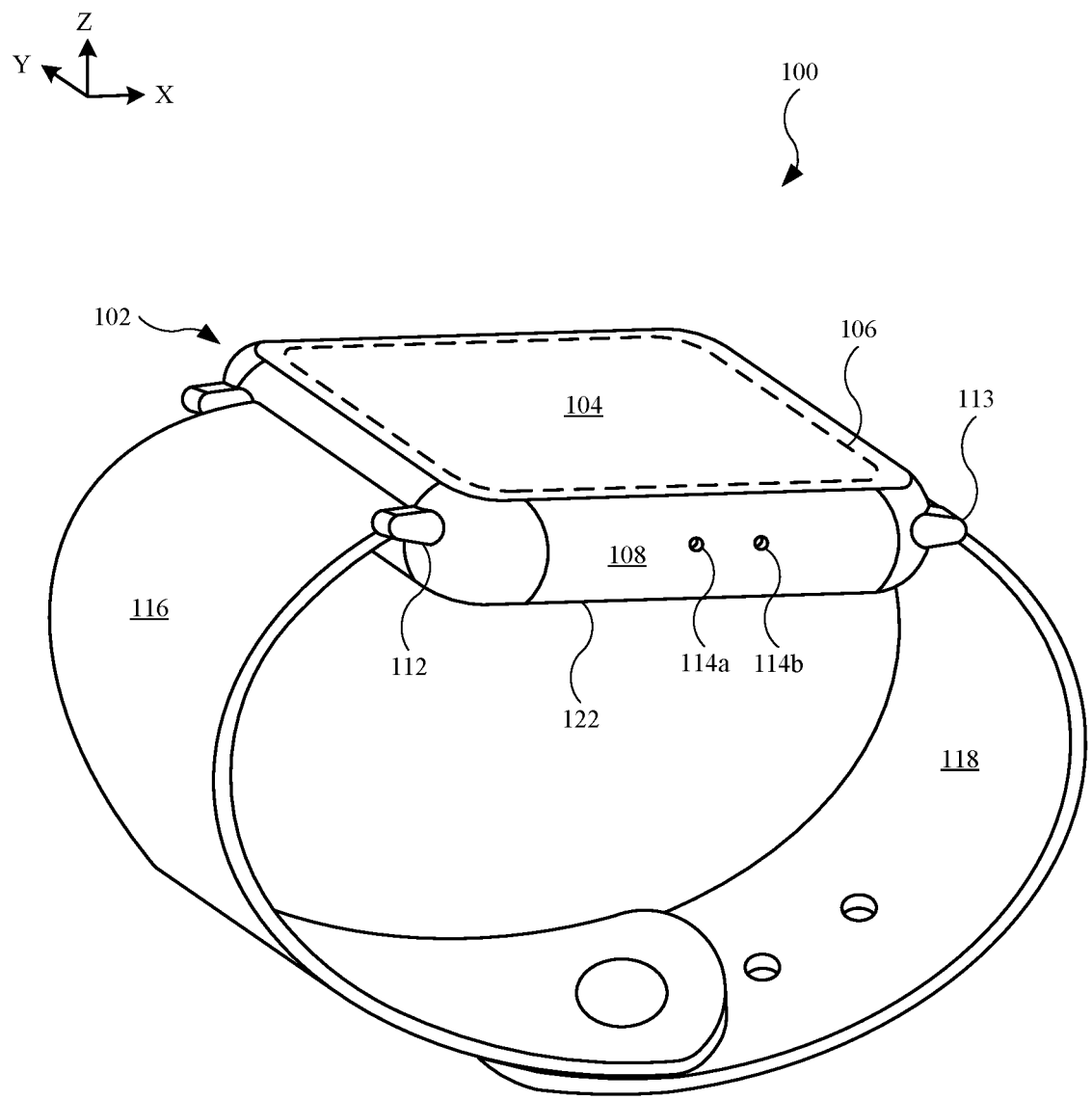
FIG. 1 illustrates a perspective view of an embodiment of a portable electronic device, according to some embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting, such that other embodiments may be used, and changes may be made without departing from the spirit and scope of the described embodiments.

The embodiments described herein set forth techniques related to portable electronic devices designed to minimize or prevent exposure of sensing modules (located in the portable electronic devices) to external contaminants that would otherwise interfere with the capacity of the sensing modules to provide accurate measurements of an external environment surrounding, or in proximity to, the portable electronic devices. In this regard, the portable electronic device may provide sensory feedback based on the measured external environment surrounding. The portable electronic device can include a housing (or enclosure) having walls that define an internal volume (or cavity). At least one of the walls may include access ports (or through hole) that extends from an exterior surface of the wall and opens to the internal volume. The housing is capable of carrying a processor and several sensing modules within the cavity. Each sensing module is capable of providing a detection signal to the processor in response to receiving an external environmental stimulus via the access ports. The processor is capable of providing the sensory feedback in response to receiving the detection signal from the sensing module. The portable electronic device may further include a plate that is coupled to the sensing modules.

The plate may position the sensing modules within the internal volume such that the sensing modules are offset, or misaligned, with the access ports. As a result, the external environmental stimulus (e.g., ambient pressure, acoustical energy) and any contaminants (e.g., dust, debris, liquid, humidity, etc.) entering the housing via the access ports must take a tortuous (i.e., indirect or non-linear) pathway to reach the sensing modules. The tortuous pathway may be defined in part by the wall (including the access ports and an internal surface of the wall) and the plate. While the environmental stimulus can reach the sensing module with little or no obstruction, the contaminants may not reach the sensing modules and may be expelled from the housing via the access ports. As a result of the contaminants not reaching the sensing modules, the sensing modules are not impaired and continue to provide an accurate measurement of the external environmental stimulus.

Although, these sensing modules are highly sensitive and are generally unable to perform sensory functions at an optimal level (e.g., accurately detect environmental conditions, etc.) when the portable electronic device is exposed to contaminants, conventional portable electronic devices with sensing modules include a straight or linear access port design. In other words, the access port is aligned and concentric with respect to a detection region of the sensing module). As a result, contaminants entering the housing via the access ports have an unencumbered pathway to the sensing modules. However, by impeding the contaminants with a tortuous flow pathway that forms an indirect and non-linear pathway from the access port to a detection region (of the sensing modules), portable electronic devices described herein significantly reduce the likelihood of degradation of the sensing modules due to the contaminants. Also, due to the location the wall and the plate within the internal volume, the tortuous pathway may include several turns, some of which form 90-degree, or perpendicular, turns. For example, the plate may be parallel to the wall, and perpendicular to the access ports formed in the wall. Also, the plate may include openings such that the external environmental stimulus can reach the sensing module. This may form yet another perpendicular turn in the tortuous flow pathway.

These and other embodiments are discussed below with reference to FIGS. 1-12. However, those skilled in the art will readily appreciate that the detailed description given herein with respect to these figures is for explanatory purposes only and should not be construed as limiting.

FIG. 1 illustrates a perspective view of an embodiment of a portable electronic device 100. According to some embodiments, the portable electronic device 100 can refer to a media player, a camera, a mobile communication device (e.g., smartphone), a computer tablet, a portable computer (e.g., laptop computer), or the like. In the embodiment shown in FIG. 1, the portable electronic device 100 is a wearable electronic device (e.g., smartwatch, fitness tracking device). The portable electronic device 100 can be configured to detect an external environmental stimulus (e.g., sound waves, pressure changes, etc.) and generate feedback based on the detected external environmental stimulus (or a detected change in the external environmental stimulus). This will be shown and described below.

As illustrated in FIG. 1, the portable electronic device 100 can include a housing 102 (or enclosure) formed from a rigid material, such as a metal, ceramic, or hardened plastic. According to some embodiments, the housing 102 may define a body that includes several walls. The walls of the body may include a bottom wall and multiple sidewalls that combine with the bottom wall to define an internal volume, or cavity, that provides space used to store and protect several internal components (not shown in FIG. 1), such as a battery, processor circuit, memory circuit, speakers, switches, flexible circuits, and sensing modules, as non-limiting examples. The portable electronic device 100 may further include a cover layer 104 coupled to the housing 102. The cover layer 104 may include a transparent material (e.g., glass, sapphire, plastic, etc.). The portable electronic device 100 may also include display unit 106 (shown as a dotted line) composed of several layers. For example, the display unit 106 may include a touch-sensitive layer designed to detect a touch input applied to the cover layer 104 by a user. The display unit 106 may further include a display layer designed to present visual information in the form of motion images (e.g., video), still images, and/or textual information. The display unit 106 may further include a force detection layer designed to detect an amount of force applied input applied to the cover layer 104 by the user. The touch-sensitive and force detection layers may be used to control the visual information presented on the display layer. Also, the cover layer 104 may overlay, or cover, the display unit 106. According to some examples, the housing 102 can include a combination of seals and/or gaskets (not shown in FIG. 1) positioned between, and/or coupled to, the housing 102 and the cover layer 104. The seals/gaskets are designed to prevent or minimize moisture intrusion into the internal volume, thereby limiting or preventing moisture ingress exposure to the components.

According to some embodiments, the portable electronic device 100 can include sensing module (not illustrated in FIG. 1) located in the internal volume of the housing 102. These sensing modules may be capable of detecting environmental conditions (including an external environmental stimulus) that surround and/or in proximity to the portable electronic device 100. In some examples, the sensing module(s) can include at least one of a microphone, a light sensor, a proximity sensor, a liquid sensor, an ambient pressure sensor, a barometric sensor, a thermometer, or the like. In response to detecting the environmental conditions, the sensing module(s) can provide a detection signal to a processor (not shown in FIG. 1) located in the internal volume, and in turn, the processor can cause the display unit 106 to present a notification to the user. For instance, the microphone may receive an environmental stimulus in the form of acoustical energy (e.g., a user's spoken words) that can be converted, once received, to electrical energy. This electrical energy can be used by a speech-to-text software program loaded on a memory circuit of the portable electronic device 100, which can then be used to display textual imagery (e.g., words) of the user's spoken words. In another example, the ambient pressure sensor may determine a pressure change corresponding to a user's elevation change. The pressure change information may be conveyed to the user by indicating, on the display unit 106, that the user's elevation has increased or decreased.

At least one of the aforementioned walls of the housing 102 may include a wall 108 having access ports. For example, the wall 108 can include a first access port 114a and a second access port 114b, both of which extend from an external surface of the wall 108 to an internal surface (not shown in FIG. 1) of the wall 108. Each of the first access port 114a and the second access port 114b may define a through hole or void in the wall 108. Also, the first access port 114a and the second access port 114b may open to the internal volume of the housing 102. It should be noted that any number of access ports can be formed one or more walls of the housing 102, and in various locations. Also, the shape of the first access port 114a and the second access port 114b is generally circular, other shapes (e.g., polygonal shape, elliptical shape, or the like) are possible. As will be described in greater detail, the access ports can provide a flow pathway that enables the external conditions, or external stimulus, to be transmitted from the external environment to the sensing module(s).

In some examples, the number of access ports is equivalent to the number of sensing modules (in the portable electronic device 100) that detect the external stimulus. For instance, the portable electronic device 100 may include two sensing modules, with one sensing module capable of receiving an external stimulus from the first access port 114a, and another sensing module capable of receiving an external stimulus from the second access port 114b. Moreover, the access ports may be arranged in an offset, or misaligned, manner from their respective sensing modules, as will be described in greater detail herein. The offset arrangement may create a non-linear flow path from the access ports to the sensing modules, which can minimize or prevent exposure of the sensing modules to an external contaminant that enters the portable electronic device 100 via the first access port 114a and/or the second access port 114b.

The first access port 114a and/or the second access port 114b can be strategically positioned along the housing 102 in a manner that renders contaminants less likely to enter into the housing 102 via the first access port 114a and/or the second access port 114b. For example, the first access port 114a and/or the second access port 114b can be positioned closer to the cover layer 104 as compared to an edge region 122 that may be in contact with, or in proximity to, a user's wrist (when the portable electronic device 100 is worn by the user). In other words, the first access port 114a and/or the second access port 114b may not be centrally located along the wall 108. This may limit or prevent contaminants (such as sweat from a user) from entering the first access port 114a and the second access port 114b, particularly when the user is wearing the portable electronic device 100 and places the portable electronic device 100 in proximity with particles (e.g., oils, food, dust, etc.). As an added advantage, the biased position of the first access port 114a and the second access port 114b allows the position of the sensing module (s) in the housing 102 to remain the same, and the only design change may include a location of the access ports. This may avoid the need for a modification or re-design of the internal architecture, or internal design layout, of the components located in the internal volume of the portable electronic device 100. While a particular position of the first access port 114a and the second access port 114b is shown in FIG. 1, the first access port 114a and/or the second access port 114b can be positioned in several different configurations. Although not shown, it should be noted that the first access port 114a and/or the second access port 114b may be centered along the wall 108. Also, in some embodiments (not shown in FIG. 1), the first access port 114a and the second access port 114b are positioned closer to the edge region 122 as compared to the cover layer 104.

Also, the portable electronic device 100 can include a first hinge 112 and a second hinge 113, each of which extending from an edge of the housing 102. The first hinge 112 may couple to a first user-attachment feature 116 (or first band), and the second hinge 113 may couple to a second user-attachment feature 118 (or second band).

Figure 2:
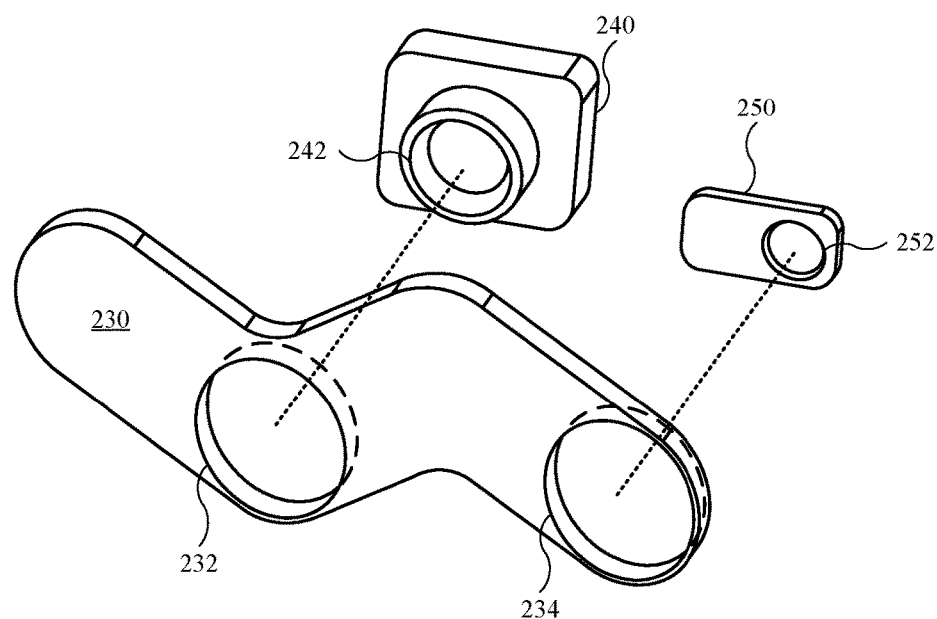
FIG. 2 illustrates an exploded view of an embodiment of an assembly that includes a plate used in conjunction with sensing modules that are used in a portable electronic device, according to some embodiments.

FIG. 2 illustrates an exploded view of an embodiment of an assembly that includes a plate 230 and sensing modules that are used in a portable electronic device, according to some embodiments. As an example, the portable electronic device may include the portable electronic device 100, shown in FIG. 1. As shown, the plate 230 (also referred to as a feature plate) includes a series of contiguous diagonal regions, which may form a "zig zag" configuration. For example, the plate 230 may include a first section 231 (or first diagonal section), a second section 233 (or second diagonal section) connected to the first section 231, and a third section 235 (or third diagonal section) connected to the second section 233. Each section may be perpendicular, or at least substantially perpendicular, to an adjacent section. This configuration may increase the surface area of the plate 230, thereby increasing available surface area for an adhesive (not shown in FIG. 2). In this regard, the bonding forces between the plate 230 and a housing (such as the housing 102 is enhanced.

The plate 230 is designed to receive and carry a first sensing module 240 and a second sensing module 250. The first sensing module 240 may include an atmospheric pressure sensor designed to measure ambient pressure. In this regard, the first sensing module 240 may receive and monitor/detect an external environmental stimulus in the form of pressure. As a result, the first sensing module 240 may modify pressure changes. The first sensing module 240 may include detection region 242 that measures the ambient pressure, with a change in ambient pressure (as determined at the detection region 242) signal a change in elevation of a portable electronic device. The second sensing module 250 may include a sound detection unit (e.g., microphone) designed to receive acoustic energy (e.g., audible sound). Accordingly, the second sensing module 250 may receive and monitor/detect an external environmental stimulus in the form of pressure pulses generated from acoustical energy. The second sensing module 250 may include detection region 252 that receives the acoustical energy and converts the acoustical energy into electrical energy in the form of audio signals that are processed by a processor (not shown in FIG. 2) of a portable electronic device.

The plate 230 may include a first opening 232, or first through hole, and a second opening 234, or second through hole. When assembled, the detection region 242 of the first sensing module 240 is aligned with the first opening 232 and the detection region 252 of the second sensing module 250 is aligned with the second opening 234. The alignment between the openings and the detection regions may include a concentric alignment or may include a portion of the detection region at least partially aligned with one of the openings.

Figure 3:
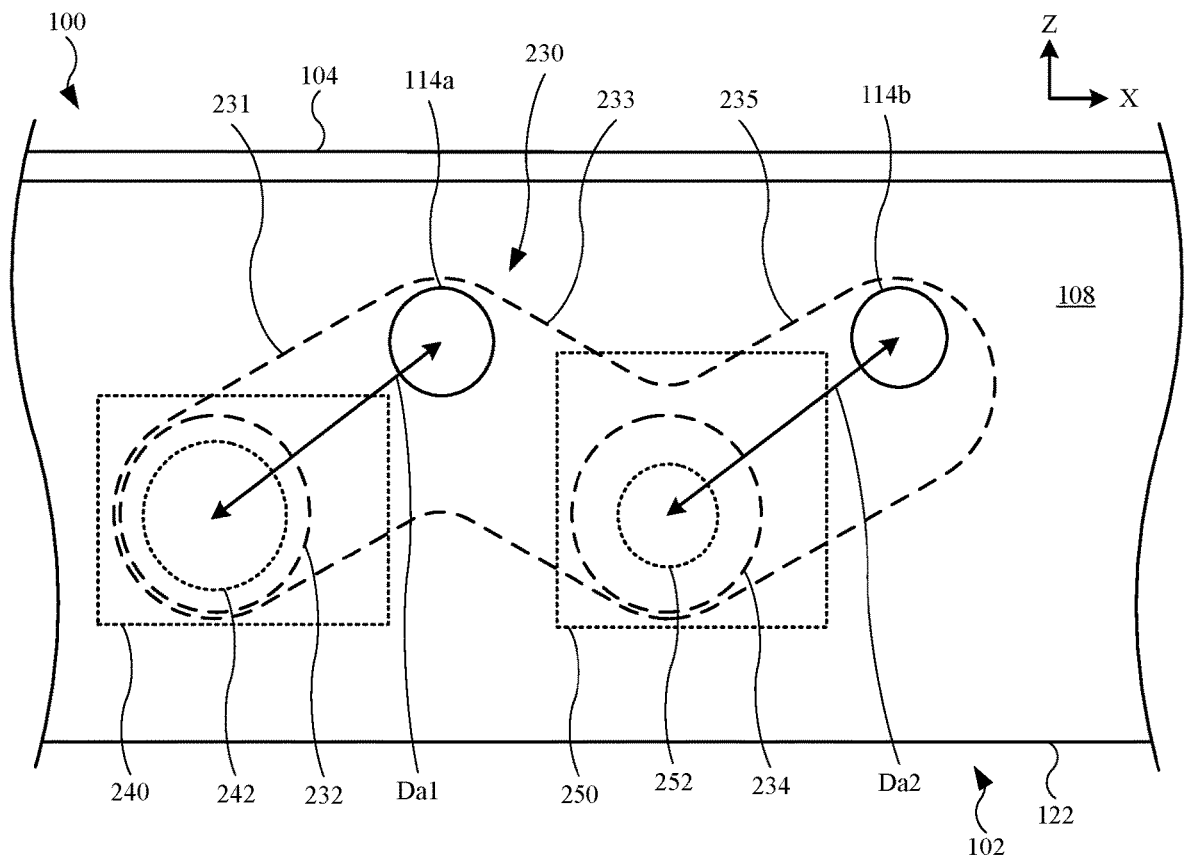
FIG. 3 illustrates a partial side view of the portable electronic device of FIG. 1, showing the relationship of the plate, the access ports, and the sensing modules (in FIG. 2), according to some embodiments.

FIG. 3 illustrates a partial side view of the portable electronic device 100 of FIG. 1, showing the relationship of the plate 230, the access ports, and the sensing modules (in FIG. 2), according to some embodiments. The plate 230 may be referred to as an internal plate when installed in the internal volume of the housing 102. As shown, the plate 230 is positioned in the housing 102 along the wall 108 in a location corresponding to the first access port 114a and the second access port 114b. Also, the plate 230 may be coupled to the housing 102 (in particular, the wall 108) by additional plates and fastening elements (not shown in FIG. 3). The first sensing module 240 and the second sensing module 250 may couple to the plate 230 such that the plate 230 carries the first sensing module 240 and the second sensing module 250. Accordingly, the housing 102 may carry the first sensing module 240 and the second sensing module 250 within the internal volume (defined in part by the wall 108 of the housing 102). It should be noted that in FIG. 3, the wall 108 covers the plate 230, the first sensing module 240, and the second sensing module 250. The plate 230 covers (or at least partially covers) the first sensing module 240 and the second sensing module 250, with the exception of the detection region 242 (of the first sensing module 240) and the detection region 252 (of the second sensing module 250).

The first access port 114a and the second access port 114b, along with the plate 230, can define, in part, a flow pathway into the housing 102 and/or out of the housing 102. The flow pathway may lead to the first sensing module 240 and the second sensing module 250. For example, the first access port 114a can provide an inlet to the first sensing module 240 and second sensing module 250. The inlet can permit for an external stimulus (e.g., sound waves, fluids, gases, etc.) to travel to the first sensing module 240 and second sensing module 250. The second access port 114b can define an outlet that can permit for external contaminants to be expelled from the cavity of the housing 102. It should be noted that each of the first access port 114a and the second access port 114b may function as an inlet and an outlet. Accordingly, by using a multi-port system, one port can receive air flow that provides a force used to expel contaminants out of the remaining port. Also, a multi-port system allows for a pressure balance within the portable electronic device 100 (particularly within the shared internal volume 270). For instance, air flow into the first access port 114a may provide pressure that causes the contaminant to remain in the portable electronic device 100. However, the contaminant (along with at least some of the air flow into the first access port 114a) may flow out of the second access port 114b, as well as excess air. Further, a multi-port system allows for additional air flow (as compared to a single access port) into the housing 102, which corresponds to decreased drying times (when the contaminant is a liquid).

The plate 230 may cover (internally) the first access port 114a and the second access port 114b but may not seal off the first access port 114a and the second access port 114b from an external environment, so to allow entry of an external environmental stimulus. However, the plate 230 may act as a guard against foreign objects (e.g., needles or other sharp objects) from further entering the housing 102. Also, the first access port 114a and the second access port 114b are generally viewable by a user. However, when the user views the first access port 114a and the second access port 114b, the first access port 114a and the second access port 114b can appear to include a specific color, which may be attributed to the color of plate 230. In this regard, through one or more processes (e.g., dye particles, anodization, physical vapor deposition, etc.), the plate 230 can be colored with a specific color. The manufacturer (of the portable electronic device 100) may select the color of the plate 230 to provide a relatively dark appearance (representing an absence of material), or to provide an appearance of a color (e.g., black, white, silver, gray, gold, rose gold) that matches that of the housing 102 to impart a generally uniform colorized appearance of the housing 102. The specific color options indicated should be construed as non-limiting examples. Further, the plate 230 may obstruct or obscure the first sensing module 240 and the second sensing module 250 such that the user cannot view the first sensing module 240 and the second sensing module 250 when looking through the first access port 114a and/or the second access port 114b. Also, the first access port 114a and the second access port 114b can have similar or different diameters. It should be noted that the diameters of the first access port 114a and the second access port 114b can be of any size that is sufficient to enable a desirable amount of an external stimulus to reach the first sensing module 240 and the second sensing module 250, while also preventing or limiting undesirable external contaminants from reaching the first sensing module 240 and second sensing module 250.

Also, the first opening 232 (of the plate 230) is aligned with the detection region 242 of the first sensing module 240, and the second opening 234 (of the plate 230) is aligned with the detection region 252 of the second sensing module 250. The first opening 232 may be concentric with respect to the detection region 242 (of the first sensing module 240), and the second opening 234 may be concentric with respect to the detection region 252 (of the second sensing module 250). Also, the plate 230 is shown in a fixed position relative to the wall 108 and is coupled to the first sensing module 240 and the second sensing module 250. The design (i.e., size and shape) of the plate 230 positions the first sensing module 240 and the second sensing module 250 in an offset manner with respect to the first access port 114a and the second access port 114b. In other words, the plate 230 positions the first sensing module 240 in a non-concentric manner with respect to the first access port 114a and the second access port 114b (or vice versa), and also positions the second sensing module 250 in a non-concentric manner with respect to the first access port 114a and the second access port 114b (or vice versa). Further, both the first access port 114a and the second access port 114b are offset, in the same plane of view, with respect to the first sensing module 240 and the second sensing module 250 in at least two dimensions (such as the X- and Z-dimensions). However, in some embodiments (not shown in FIG. 3), the first access port 114a and the second access port 114b are offset in a single dimension (the X- or Z-dimension) with respect to the first sensing module 240 and the second sensing module 250. Furthermore, the plate 230 may position the first sensing module 240 and the second sensing module 250 such that an outer perimeter of the detection region 242 (of the first sensing module 240) and an outer perimeter of the detection region 252 (of the second sensing module 250) does not overlap with an outer perimeter of the first access port 114a and an outer perimeter of the second access port 114b. Thus, the plate 230 imparts an offset positioning of the first sensing module 240 and the second sensing module 250 with respect to the first access port 114a and the second access port 114b such that an external stimulus must flow along a tortuous pathway from the first access port 114a and/or the second access port 114b to the detection region 242 (of the first sensing module 240) and the detection region 252 (of the second sensing module 250). A "tortuous pathway" may refer to a non-linear pathway created in part by the offset position/configuration between the access ports and the detection regions (of the sensing modules). As an example, the tortuous pathway may include a path beginning at the first access port 114a, continuing along the plate 230 in a direction perpendicular (and diagonal) with respect to the first access port 114a, and then through the first opening 232 in a direction perpendicular with respect to the plate 230.

The tortuous pathway may permit an environmental external stimulus to reach the sensing modules (and in particular, the detection regions of the sensing modules), while also impeding or preventing contaminants entering the access ports from reaching the sensing modules. Regarding the latter, when a contaminant (e.g., liquid, debris, surfactant) enters an access port and is positioned in the tortuous pathway, accurate detection of the external environmental stimulus by at least one of the first sensing module 240 and the second sensing module 250 can be negatively affected. For example, when the first sensing module 240 is a pressure sensor designed to detect (using the detection region 242) an amount of ambient pressure, a contaminant present within the portable electronic device 100 can cause a pressure signal error due to capillary pressure formed in the housing 102. Additionally, when the second sensing module 250 is a microphone, the presence of a contaminant can affect the accuracy of sound detection at the detection region 252 of the second sensing module 250. However, the tortuous pathway may impede the path of foreign objects from reaching detection regions of the aforementioned sensing modules, which may limit or prevent performance degradation of the sensing modules. Further, the design of the plate 230, and the position of the plate 230 within the housing 102, may limit or block movement of the contaminant once inside the housing 102. Additionally, due to the impeded, limited, or blocked movement of the contaminant, the contaminant may travel only a short distance away from the access port (in which the contaminant entered). As a result, movement of the portable electronic device 100 (e.g., user-initiated movement) may provide a force that expels the contaminant from the housing 102 via the access port (in which the contaminant entered).

As illustrated in FIG. 3, a center point of the detection region 242 (of first sensing module 240) is separated from a center point of the first access port 114a by a separation distance Da1, and a center point of the second sensing module 250 is separated from a center point of the second access port 114b by a separation distance Db1. In some embodiments, the separation distance Da1 is different from the separation distance Db1. In the embodiment shown in FIG. 3, the separation distance Da1 is the same (or at least substantially similar) to the separation distance Db1. As will be described in greater detail herein, the separation distance between the access ports and the sensing modules can correspond to a distance of a flow pathway. Also, as shown in FIG. 3, the first access port 114a and the second access port 114b are biased toward the cover layer 104. That is, the first access port 114a and the second access port 114b are closer to the cover layer 104 than the edge region 122 that may be in contact with the user's wrist, which may prevent contaminants originating from the user's wrist from entering the first access port 114a and the second access port 114b.

Figure 4:
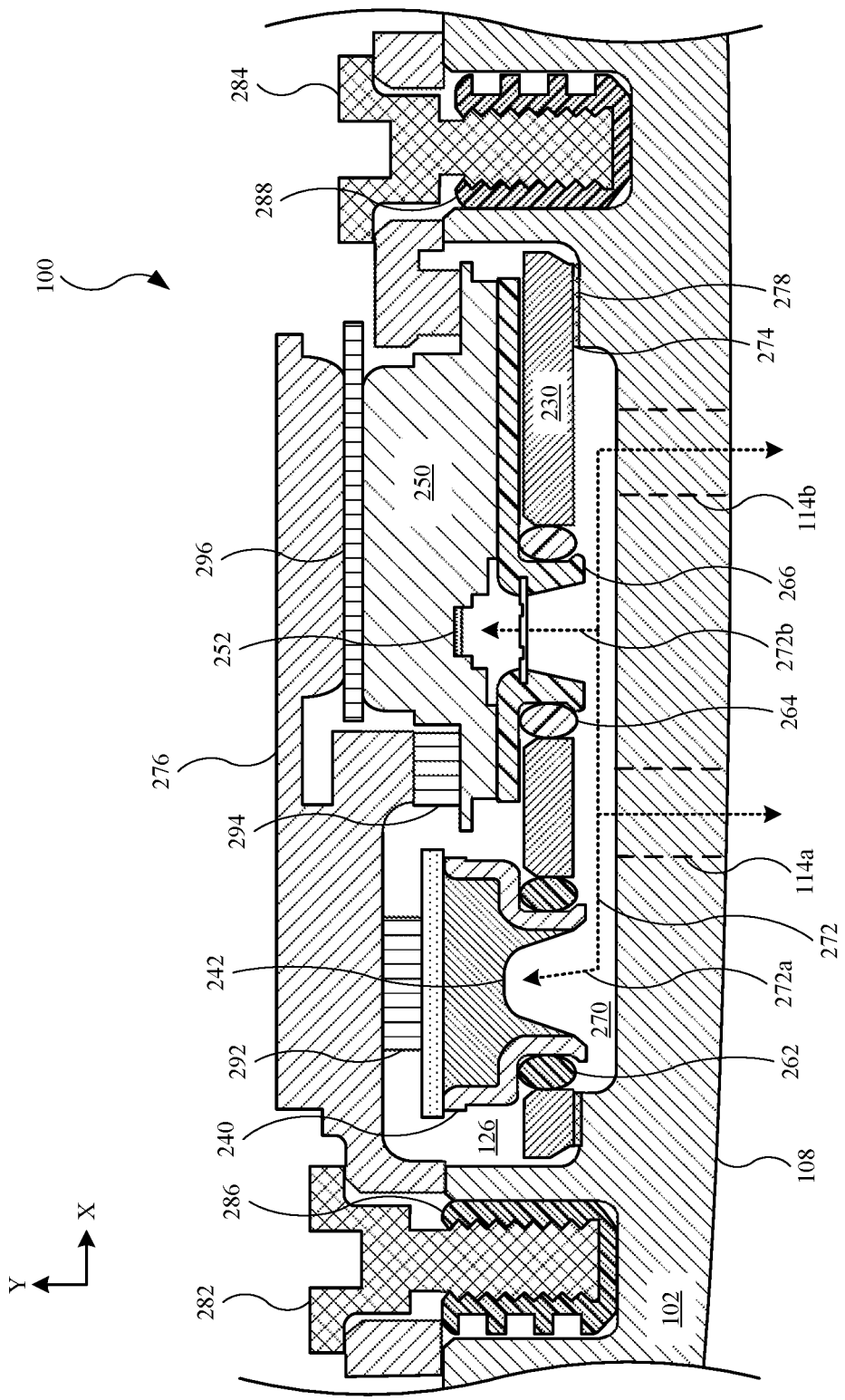
FIG. 4 illustrates a cross-sectional view of the portable electronic device of FIG. 3, according to some embodiments.

FIG. 4 illustrates a cross-sectional view of the portable electronic device 100 of FIG. 3, according to some embodiments. As shown, the housing 102 may define an internal volume 126 (or internal cavity, or simply cavity) in which the first sensing module 240 and the second sensing module 250 are positioned. The first sensing module 240 may couple with the plate 230 by a sealing element 262, and the second sensing module 250 may couple with the plate 230 by a sealing element 264. The aforementioned sealing elements may include an O-ring (including a radial O-ring) or gasket formed from a compliant and liquid-resistant material, such as rubber or elastomer. Furthermore, the first sensing module 240 may at least partially extend through the first opening 232 (labeled in FIG. 3) of the plate 230, while the second sensing module 250 is coupled to a fitting 266 that at least partially extends through the second opening 234 (labeled in FIG. 3) of the plate 230.

The first access port 114a and the second access port 114b (also shown and described in FIG. 3) are represented as dotted lines in the wall 108, as the first access port 114a and the second access port 114b are located in a different section of the wall 108 not within the X-Y plane, as shown in FIG. 4. The first access port 114a and the second access port 114b can open to a region of the internal volume 126 in which the first sensing module 240 and the second sensing module 250 are located. In particular, the first access port 114a and the second access port 114b can open to a shared internal volume 270 within the housing 102. The shared internal volume 270 may fluidly connect the first sensing module 240 and the second sensing module 250 with the first access port 114a and the second access port 114b. The shared internal volume 270 allows a flow pathway 272 to extend from the first access port 114a and the second access port 114b to the first sensing module 240 and the second sensing module 250.

According to some examples, the shared internal volume 270 can represent a volume that is sealed off from the internal volume 126. The sealing may prevent particles or fluids from the internal volume 126 from infiltrating into the first flow pathway 272a and second flow pathway 272b. Additionally, the pressure in the shared internal volume 270 may adjust to equilibrium with the external environment by air flow into, or out of, the first access port 114a and the second access port 114b. A multi-port system in which the ports opens to the shared internal volume 270 provides for a redundant system such that if, for example, the first access port 114a plugged or clogged, the second access port 114b provide an air flow inlet/outlet, and the portable electronic device 100 continues to perform in a desired manner. Also, The flow pathway 272 may define a tortuous flow pathway, as the flow pathway provides an indirect, non-linear pathway from the access ports to the sensing modules. The flow pathway 272 may include a first flow pathway 272a that leads to the first sensing module 240 (and in particular, the detection region 242). The flow pathway 272 may include a second flow pathway 272b that leads to the second sensing module 250 (and in particular, the detection region 252). The first flow pathway 272a and the second flow pathway 272b can define a shared internal volume 270. Also, as shown in FIG. 4, the flow pathway 272 may a pathway through the wall 108 (via the first access port 114a and the second access port 114b) that leads to the first sensing module 240 and the second sensing module 250. As a result, the first sensing module 240 and the second sensing module 250 (in particular, their respective detection regions) may receive an external environmental stimulus originating outside of the portable electronic device 100.

Due in part to the non-linear, tortuous pathway), any foreign objects or contaminants entering the first access port 114a and/or the second access port 114b do not have direct access to the first sensing module 240 and second sensing module 250. For instance, in order to for a foreign object to reach the first sensing module 240, the foreign object must first enter the first access port 114a, then travel along the plate 230 along a two-dimensional path (as represented in part by the diagonal structure of the plate 230, illustrated in FIGS. 2 and 3) that is perpendicular to the first access port 114a, and then pass through the first opening 232 (shown in FIGS. 2 and 3) of the plate 230, which defines a path that is perpendicular to the plate 230. However, at any point along this non-linear, tortuous pathway, the foreign object may be expelled from the housing 102 via the first access port 114a and/or the second access port 114b, thereby causing the foreign object to be removed from the portable electronic device 100. By not providing a direct path for the foreign object to the first sensing module 240 and the second sensing module 250, the foreign object may be limited or prevented from causing damage to, or degraded performed of, the first sensing module 240 and the second sensing module 250, as the detection region 242 (of the first sensing module 240) and the detection region 252 (of the second sensing module 250) is not exposed to the foreign object. Also, should a foreign object reach the sensing modules, the sensing modules may be modified to withstand the foreign object. For example, the detection region 242 of the first sensing module 240 and the detection region 252 of the second sensing module 250 may include a material(s) that is/are sensitive to debris. For example, the first sensing module 240 may include a gel that liquid-resistant shield for a movable diaphragm. Also, the gel may include an adhesive that readily attracts debris and other particles.

The housing 102 may include a mating surface 278 that extends from an internal surface of the housing 102 and protrudes into the internal volume 126 of the housing 102. In some examples, the mating surface 278 can include elevated portions that partially define the internal volume 126. Additionally, the mating surface 278 may receive the plate 230. In this regard, the plate 230 may couple to the wall 108 by an adhesive 274. The adhesive 274 may include a pressure-sensitive adhesive, epoxy, or the like. The plate 230 may include an additional surface that is generally planar and capable of supporting the first sensing module 240 and second sensing module 250 at different regions. Also, the adhesive 274 and the aforementioned sealing elements may provide a liquid-resistant (and in some instances, an air-resistant) for the shared internal volume 270 such that the shared internal volume 270 is sealed from the internal volume 126.

The portable electronic device 100 may further include a bracket 276 that is positioned over the first sensing module 240 and the second sensing module 250. The bracket 276 may be secured to the housing 102 by a first fastening element 282 and a second fastening element 284. The housing 102 may carry a first fastener receiving structure 286 and a second fastener receiving structure 288 designed to receive the first fastening element 282 and the second fastening element 284, respectively. The portable electronic device 100 can include foam supports. For example, the portable electronic device 100 may include a first foam support 292 and a second foam support 294 coupled to the bracket 276 and the first sensing module 240. The portable electronic device 100 may further include a third foam support 296 coupled to the bracket 276 and the second sensing module 250. These foam supports may alleviate some of the pressure induced by the bracket 276 to the first sensing module 240 and the second sensing module 250. Further, by absorbing a force or load, the aforementioned foam supports can minimize the risk of damage to the first sensing module 240 and the second sensing module 250 during an installation operation. Additionally, the aforementioned foam supports may absorb some force during a pressure change event within the shared internal volume 270. Also, the aforementioned foam supports may provide a force to the sensing modules to maintain the sensing modules aligned with the plate 230. For example, if the shared internal volume 270 undergoes a pressure increase, the aforementioned foam supports can alleviate at least some pressure induced on the first sensing module 240 and the second sensing module 250. This may reduce premature wear to the adhesive 274 by maintaining the first sensing module 240 and the second sensing module 250 in a generally fixed position.

Figure 5:
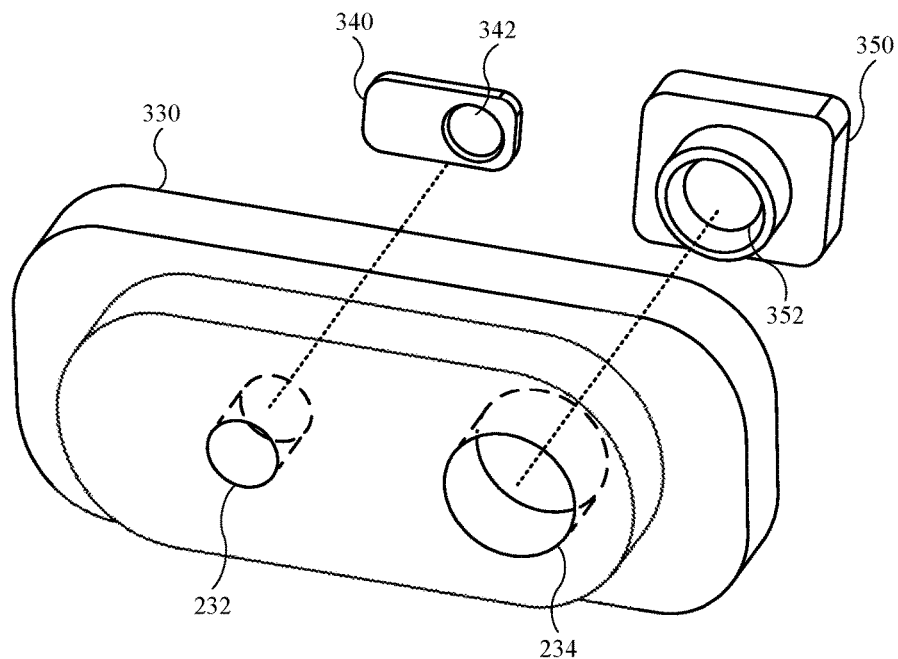
FIG. 5 illustrates an exploded view of an alternate embodiment of an assembly that includes a plate used in conjunction with sensing modules that are used in a portable electronic device, according to some embodiments.

FIG. 5 illustrates an exploded view of an alternate embodiment of an assembly that includes a plate 330 used in conjunction with sensing modules that are used in a portable electronic device, according to some embodiments. The portable electronic device may include a portable electronic device described herein, such as the portable electronic device (shown in FIG. 1). As shown, the plate 330 (also referred to as a manifold) includes a stepped configuration designed to provide a recess (not shown in FIG. 5) that receives sensing modules. This will be shown below. The plate 330 can receive and carry a first sensing module 340 and a second sensing module 350. The first sensing module 340 and the second sensing module 350 may include at least some features and provide at least some functions for a sensing module described herein. The plate 330 may include a first opening 332, or first through hole, and a second opening 334, or second through hole. When assembled, a detection region 342 of the first sensing module 340 is aligned with the first opening 332 and a detection region 352 of the second sensing module 350 is aligned with the second opening 334. The alignment between the openings and the detection regions may include a concentric alignment or may include a portion of the detection region at least partially aligned with one of the openings.

Figure 6:
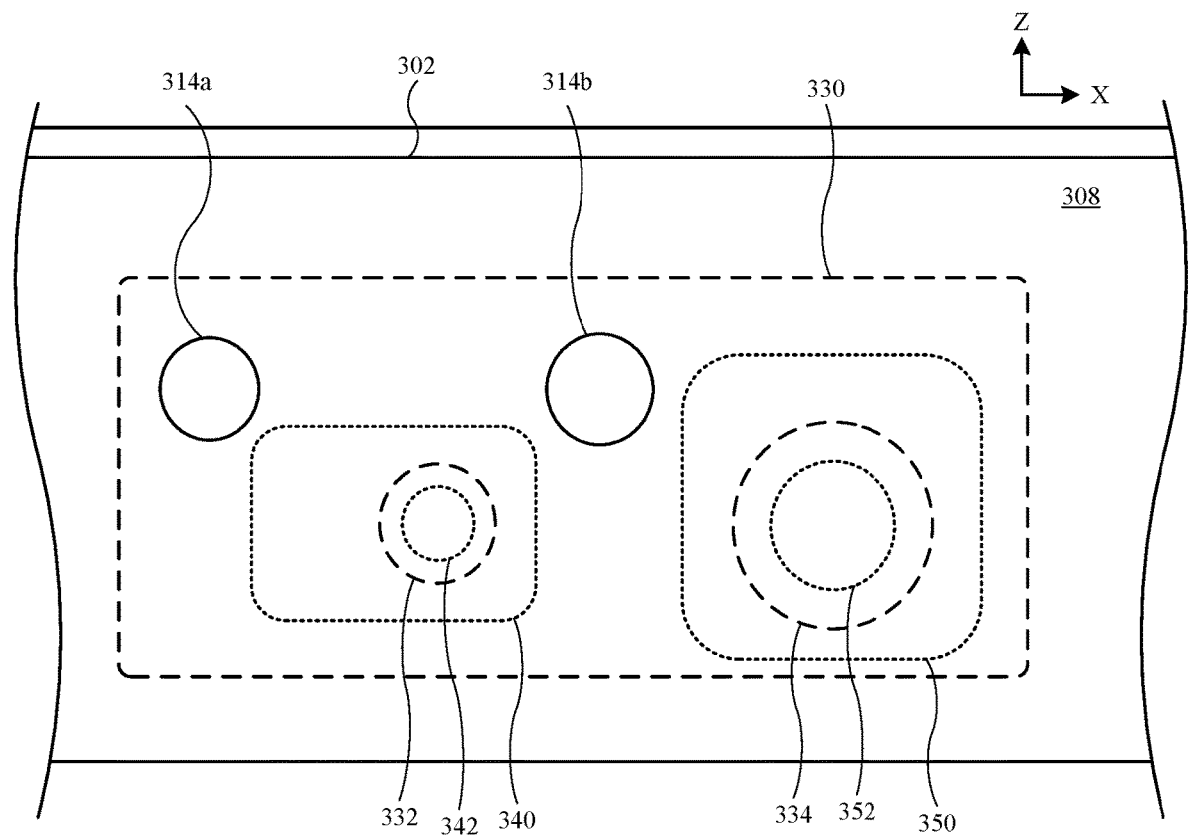
FIG. 6 illustrates a partial side view of an embodiment of a portable electronic device, showing the relationship of the plate and the sensing modules (in FIG. 5), according to some embodiments.

FIG. 6 illustrates a partial side view of a portable electronic device 300, showing the relationship of the plate 330, the access ports, and the sensing modules (in FIG. 5), according to some embodiments. Similar to a manner previously described, the portable electronic device 300 may include a housing 302 having a wall 308. The wall 308 may include a first access port 314a and a second access port 314b. As shown, the plate 330 is positioned the housing 302 along the wall 308 in a location corresponding to the first access port 314a and the second access port 314b. Also, the plate 330 may be coupled to the housing 302 (in particular, the wall 308) by additional plates and fastening elements (not shown in FIG. 6). The first sensing module 340 and the second sensing module 350 may couple to the plate 330 such that the plate 330 carries the first sensing module 340 and the second sensing module 350. Accordingly, the housing 302 may carry the first sensing module 340 and the second sensing module 350 within the internal volume (defined in part by the wall 308 of the housing 302). It should be noted that in FIG. 6, the wall 308 covers the plate 330, the first sensing module 340, and the second sensing module 350. Also, the plate 230 covers (or at least partially covers) the first sensing module 340 and the second sensing module 350, with the exception of the detection region 342 (of the first sensing module 340) and the detection region 352 (of the second sensing module 350).

As illustrated in FIG. 6, the housing 302 carries the first sensing module 340 and the second sensing module 350 within the cavity (defined in part by the wall 308 of the housing 302). The first access port 314a and the second access port 314b defines, in part, a flow pathway (shown and described below) into the housing 302 (and to the cavity) and/or out of the housing 302. The flow pathway may lead to the first sensing module 340 and the second sensing module 350, similar to a manner previously described. The plate 230 (also referred to as an internal manifold when installed in the housing 302) may further define the flow pathway.

The plate 330 covers (internally) the first access port 314a and the second access port 314b but may not seal the first access port 314a and the second access port 314b, so as to allow an external environmental stimulus into the housing 302. However, the plate 230 may act as a guard against foreign objects from further entering the housing 302. Also, the first access port 314a and the second access port 314b are generally viewable by a user. However, when the user views the first access port 314a and the second access port 314b, the first access port 314a and the second access port 314b can appear to include a specific color, which may be attributed to the color of plate 330, similar to a manner previously described. Further, the plate 330 obstructs or obscures the first sensing module 340 and the second sensing module 350 such that the user cannot view the first sensing module 340 and the second sensing module 350 when looking through the first access port 314a and/or and the second access port 314b. The diameter of first access port 314a and the second access port 314b may be similar or different, and may embody different shapes, similar to a previously described embodiment.

The first opening 332 (of the plate 330) is aligned with the detection region 342 of the first sensing module 340, and the second opening 334 (of the plate 330) is aligned with the detection region 352 of the second sensing module 350. The first opening 332 may be concentric with respect to the detection region 342 (of the first sensing module 340), and the second opening 334 may be concentric with respect to the detection region 352 (of the second sensing module 350). When fixed to the wall 308 and coupled to the first sensing module 340 and the second sensing module 350, the plate 330 positions the first sensing module 340 and the second sensing module 350 in an offset manner with respect to the first access port 314a and the second access port 314b, including an offset configuration with respect to the first access port 314a and the second access port 314b in at least two dimensions (such as the X- and Z-dimensions). Similar to a prior embodiment, there is no overlap between the outer perimeter of the access ports and the outer perimeter of the detection regions, thereby causing an external stimulus to flow along a non-linear, tortuous pathway from an exterior surface of the wall 308, through the first access port 314a and/or the second access port 314b, along the plate 330, and through the first opening 332 and/or the second opening 334, in order reach the detection region 342 (of the first sensing module 340) and/or the detection region 352 (of the second sensing module 350), respectively.

Figure 7:
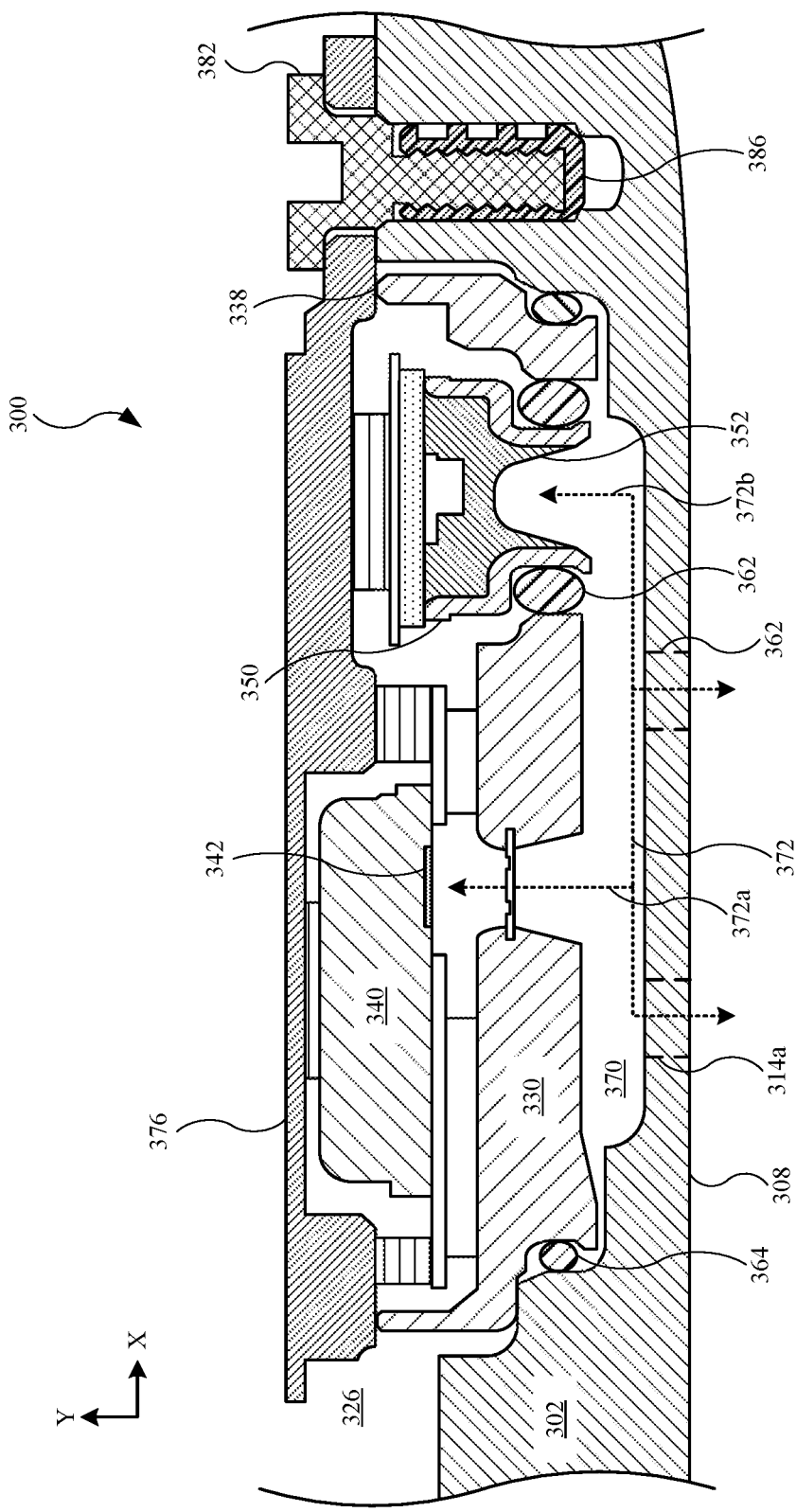
FIG. 7 illustrates a cross-sectional view of the portable electronic device of FIG. 6, according to some embodiments.

FIG. 7 illustrates a cross-sectional view of the portable electronic device 300 of FIG. 6, according to some embodiments. As shown, the first sensing module 340 and the second sensing module 350 are partially positioned in a recess (not labeled) defined by the plate 330. The first sensing module 340 may couple to the plate 330 by an adhesive (not labeled), while the second sensing module 350 may couple to the plate 330 by a sealing element 362. The plate 330 may couple to the housing 302 by a sealing element 364. The plate 330, the first sensing module 340, and the second sensing module 350 may form a sub-assembly that may be pre-assembled together and then placed in the housing 302, and in particular, in an internal volume 326 of the housing 302. The sub-assembly may improve the overall assembly process of the portable electronic device 300 by, for example, decreasing the assembly and manufacturing times. Also, as shown in FIG. 7, the location of the sensing modules can be rearranged. For example, the first sensing module 340 may include a microphone, while the second sensing module 350 may include an ambient pressure sensor.

The first access port 314a and the second access port 314b (also shown and described in FIG. 6) are represented as dotted lines in the wall 308, as the first access port 314a and the second access port 314b are located in a different section of the wall 308 not within the X-Y plane shown in FIG. 7. The first access port 314a and the second access port 314b can open to a region of the internal volume 326 in which the first sensing module 340 and the second sensing module 350 are located. Similar to a prior embodiment, the first sensing module 340 and the second sensing module 350 may be fluidly connected to the first access port 314a and the second access port 314b by a flow pathway 372. The flow pathway 372 may include a tortuous flow pathway that defines a non-linear pathway (similar to a previously described embodiment), which may impart a non-linear path for an external environmental stimulus or a contaminant that enters the housing 302. The flow pathway 372 may include a first flow pathway 372a that leads to the first sensing module 340 (and in particular, the detection region 342), and a second flow pathway 372b that leads to the second sensing module 350 (and in particular, the detection region 352). As a result, the first sensing module 340 and the second sensing module 350 (in particular, their respective detection regions) may receive an external environmental stimulus originating outside of the portable electronic device 300.

The first access port 314a and the second access port 314b can extend between the external environment and a shared internal volume 370 of the internal volume 326. The wall 308 and the plate 330 can define, in part, the shared internal volume 370. The shared internal volume 370 may fluidly connect the first sensing module 340 and the second sensing module 350 with the first access port 314a and the second access port 314b. The shared internal volume 370 allows a flow pathway 372 to extend from the first access port 314a and the second access port 314b to the first sensing module 340 and the second sensing module 350. According to some examples, the shared internal volume 370 can represent a sealed environment that prevents particles or fluids (aside from the external environmental stimulus) from infiltrating into the first flow pathway 372a and second flow pathway 372b. Additionally, the pressure in the shared internal volume 370 may adjust to equilibrium with the external environment using the first access port 314a and the second access port 314b.

Similar to a prior embodiment, the portable electronic device 300 may further include a bracket 376 that is positioned over the first sensing module 340 and the second sensing module 350. The bracket 376 may be secured to the housing 302 by a fastening element 382 engaged with a fastener receiving structure 386, which is coupled to the housing 302. The portable electronic device 300 can include foam supports (not labeled in FIG. 7) that are capable of alleviating some of the pressure induced by the bracket 376 to the first sensing module 340 and the second sensing module 350. Further, the aforementioned foam supports can minimize the risk of damage to the first sensing module 340 and the second sensing module 350 during an installation operation. Additionally, the aforementioned foam supports may absorb some force forced pressure event within the shared internal volume 370. For example, if the shared internal volume 370 undergoes a pressure increase, the aforementioned foam supports can alleviate at least some pressure induced on the first sensing module 340 and the second sensing module 350. This may reduce premature wear to the adhesive that secure components together by maintaining the first sensing module 340 and the second sensing module 350 in a generally fixed position.

The aforementioned sub-assembly may also include the bracket 376 integrated with the plate 330, the first sensing module 340, and the second sensing module 350, such that these components are packaged and sealed together outside the portable electronic device 300 prior to installing in the internal volume 326. As a result, the sub-assembly can be tested outside of the housing 302 prior to installing within the housing 302. In particular, the testing may check for proper air sealing by the sealing elements and/or adhesives. Further, the sub-assembly (by way of the aforementioned components) may define an internal environment that is sealed from the remainder of the internal volume 326. Accordingly, in some instances, the installation of the sub-assembly within the internal volume 326 may be distinct from a piecewise installation of components that are sequentially installed and individually tested prior to be installed. Also, the sealing element 364 may provide sealing/isolating capabilities of the sub-assembly. The sealing element 364 can be tested outside of the housing 302 to ensure that the sealing element 364 is within a specified tolerance.

The plate 330 may include a deformable rib 338 that extends around a perimeter of the plate 330. The deformable rib 338 can compensate for any deviations in tolerances of the plate 330 and/or the housing 302. Because the plate 330 may be compressed against the housing 302 (by way of fastening element 382 as an example), the deformable rib 338 may collapse or compress in predetermined locations when some components vary within a predetermined specification, and in some instances, are not within the predetermined specification. In some examples, the deformable rib 338 can extend beyond (in the Y-dimension) regions of the housing 302 such that the deformable rib 338 deforms when the bracket 376 is attached or fastened to the housing 302. In this manner, the deformable rib 338 can render the sub-assembly compliant such that it does not shift relative to the housing 302 within the internal volume 326. This may reduce stress and premature wear of adhesives (not labeled) used to secure together components of the sub-assembly.

Figure 8:
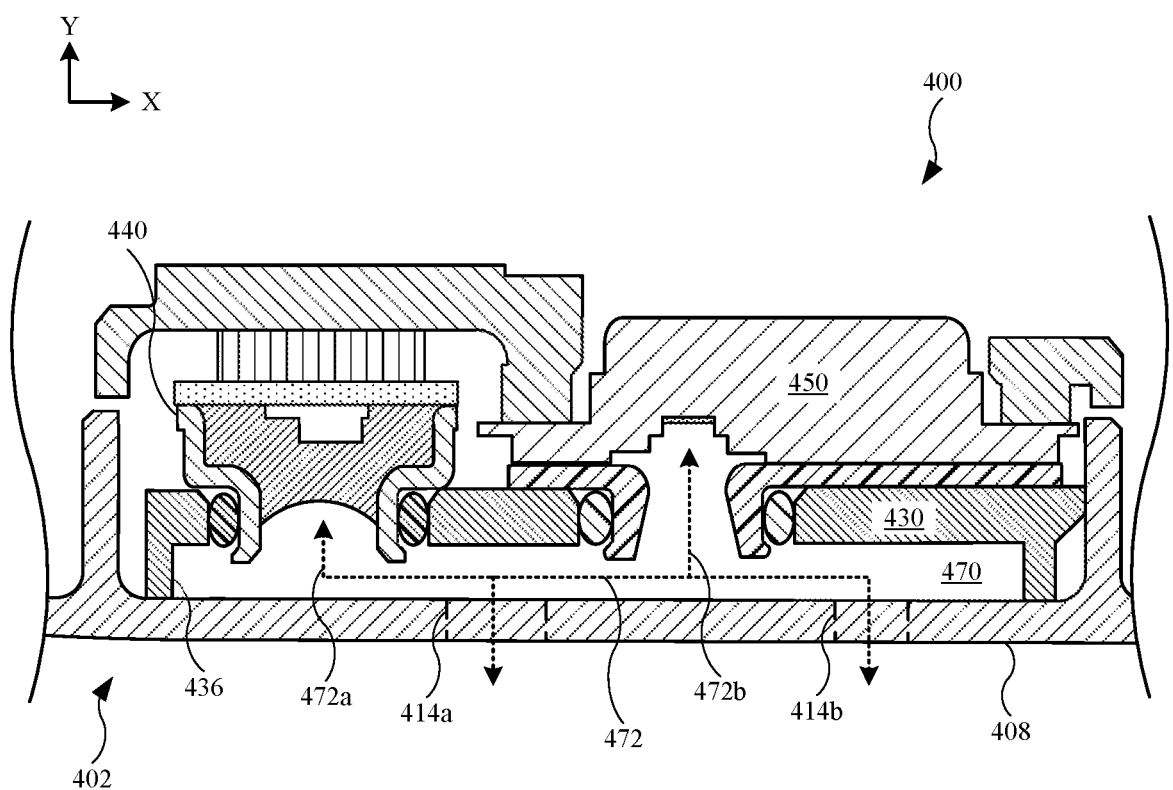
FIG. 8 illustrates a cross-sectional view of an alternate embodiment of a portable electronic device, according to some embodiments.

FIG. 8 illustrates a cross-sectional view of an alternate embodiment of a portable electronic device 400, according to some embodiments. The portable electronic device 400 may incorporate several features described herein for a portable electronic device. As shown, the portable electronic device 400 may include a housing 402 that carries a plate 430, a first sensing module 440, and a second sensing module 450.

The housing 402 may include a wall 408. The wall 408 may include a first access port 414a and a second access port 414b. The first access port 414a and the second access port 414b are represented as dotted lines in the wall 408, as the first access port 114a and the second access port 114b are located in a different section of the wall 408 not within the X-Y plane shown in FIG. 8. In this regard, the first access port 414a and the second access port 414b may be offset with respect to the first sensing module 440 and the second sensing module 450 in at least two dimensions, in a manner similar to the offset relationship between the access ports and sensing modules shown in FIG. 4. Also, similar to a manner previously described, the first access port 414a and the second access port 414b are fluidly connected to the first sensing module 440 and the second sensing module 450 by a flow pathway 472, which may include a first flow pathway 472a that leads to the first sensing module 440, as well as a second flow pathway 472b that leads to the second sensing module 450. The flow pathway 472 defines a pathway through the wall 408 (via the first access port 414a and the second access port 414b) that leads to the first sensing module 440 and the second sensing module 450. As a result, the first sensing module 440 and the second sensing module 450 (in particular, their respective detection regions) may receive an external environmental stimulus originating outside of the portable electronic device 400.

In contrast to prior embodiments of a plate having generally planar surfaces, the plate 430 may include an elongated support structure 436 that protrudes from a planar portion of the plate 430 and extends along a perimeter of the plate 430. As shown, the plate 430 is coupled to and/or in contact with the internal surface of the housing 402 via the elongated support structure 436. The elongated support structure 436 can be integrally formed with the plate 430 or welded to the plate 430. According to some examples, the elongated support structure 436 and the plate 430 can define an L-shaped design. However, a variety of other shapes and designs can also be implemented in order to elevate the plate 430 over the housing 402.

The elongated support structure 436 can elevate the plate 430 over the internal surface of the housing 402 to form a shared internal volume 470 without necessitating a modification of the wall 408. For example, the wall 408 lacks a mating surface (such as the mating surface 278 shown in FIG. 4 that extends from the internal surface of the housing 402 into the internal volume 126). Instead, the wall 408 includes a generally uniform thickness at the regions where the plate 430 would otherwise be mounted to the housing 402. Beneficially, the elongated support structure 436 allows for a significantly reduced thickness of the wall 408 of the housing 402 relative to prior embodiments, while still providing the advantages of having the shared internal volume 470 with multiple flow pathways. As shown, the elongated support structure 436 is positioned against the internal surface of the housing 402. Also, the elongated support structure 436 elevates the plate 430, and in particular, the first sensing module 440 and the second sensing module 450 over the internal surface of the housing 402 such that a flow pathway 472 is defined. Similar to prior embodiments, the flow pathway 472 is located in the shared internal volume 470. Also, the flow pathway 472 includes a first flow pathway 472a and a second flow pathway 472b.

Figure 9:
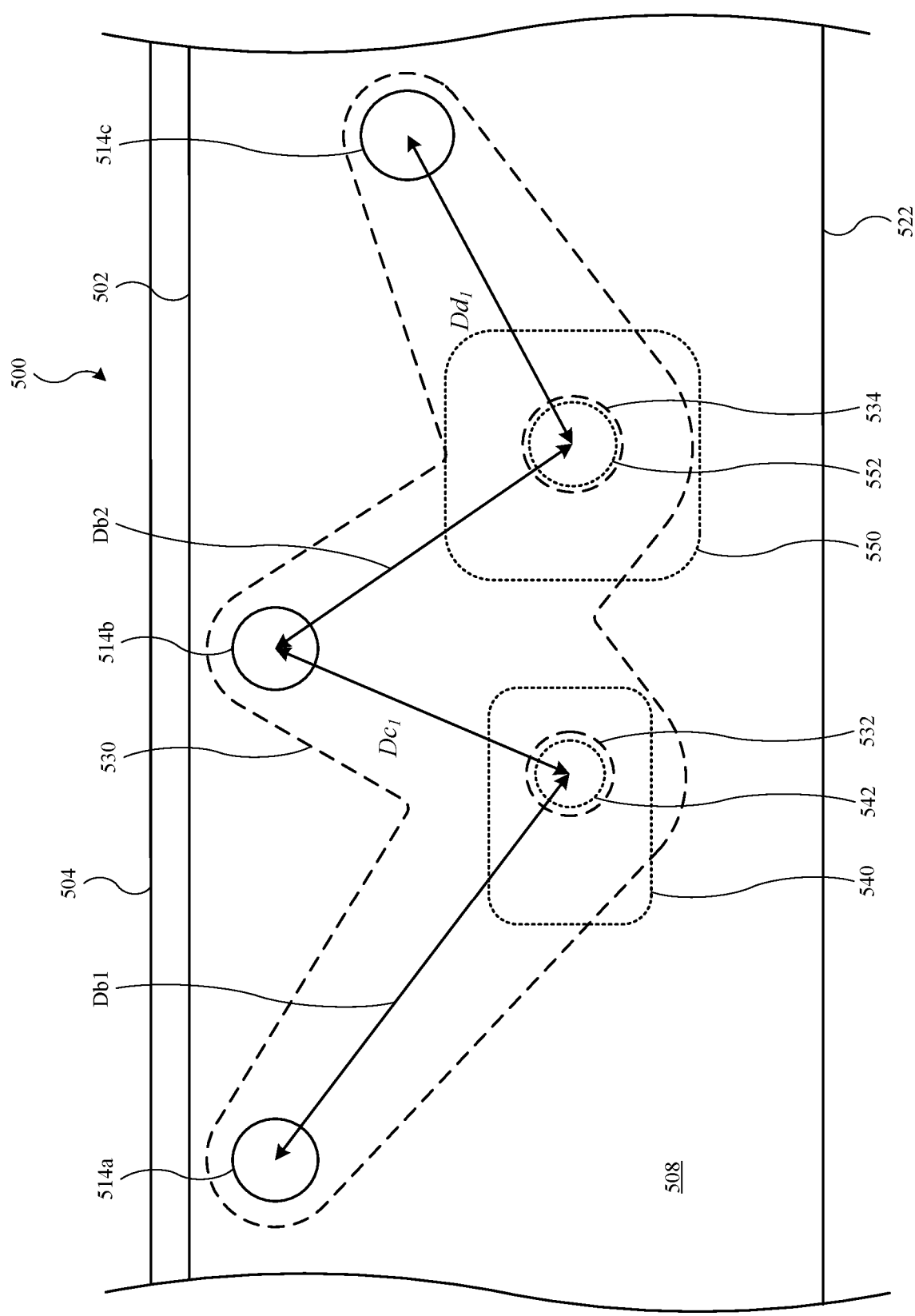
FIG. 9 illustrates a partial side view of an alternate embodiment of a portable electronic device that include access ports positioned towards an upper edge of a housing of the portable electronic device, in accordance with some described embodiments.
Figure 10:
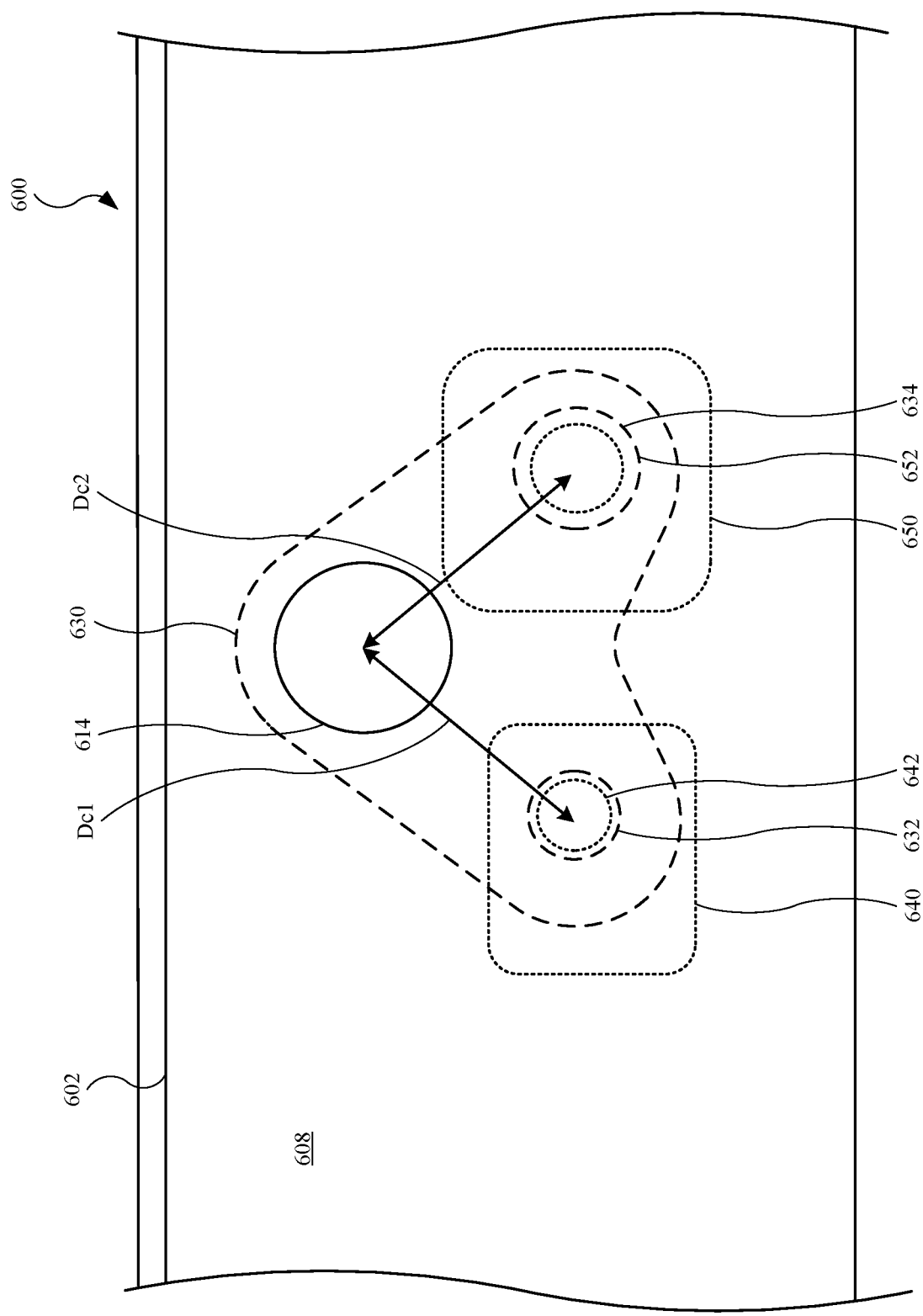
FIG. 10 illustrates a partial side view of an alternate embodiment of a portable electronic device, showing a wall with a single access port, according to some embodiments.
Figure 11:
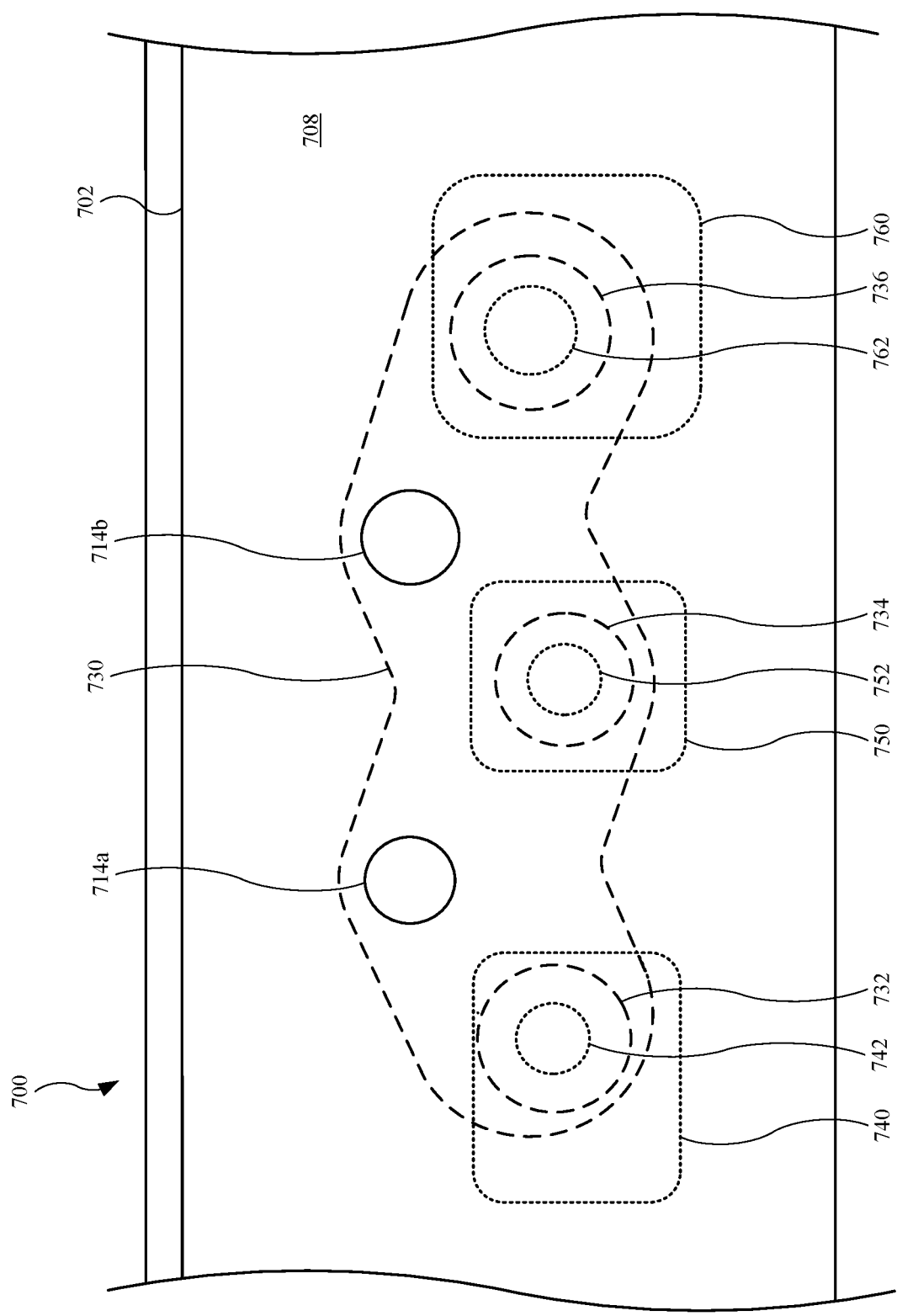
FIG. 11 illustrates a partial side view of an alternate embodiment of a portable electronic device, showing a plate that covers additional sensing modules, according to some embodiments.

FIGS. 9-11 illustrate partial cross-sectional views of portable electronic devices. In particular, FIGS. 9-11 illustrate exemplary different arrangements between positions of the sensing modules and positions of the access ports. Although a partial section is shown, the embodiments shown in FIGS. 9-11 may include several feature and components described herein for a portable electronic device. For example, the sensing modules and the plates described in FIGS. 9-11 may include features and details previously described for a plate and a sensing module, respectively. Also, re-positioning the locations of the access ports may nonetheless maintain a non-linear, tortuous pathway between access ports and the sensing modules. By arranging the access ports and the sensing modules that maintains the tortuous flow pathway, additional usable surface area of a plate (internal plate or manifold) used to carry sensing modules is available. In this regard, the additional usable surface of the plate provides for additional adhesive, thereby providing a stronger adhesive attachment between the plate and the housing.

FIG. 9 illustrates a partial side view of an alternate embodiment of a portable electronic device 500 that include access ports positioned towards an upper edge of a housing 502 of the portable electronic device 500, in accordance with some described embodiments. The portable electronic device 500 may include a plate 530 that carries a first sensing module 540 and a second sensing module 550. The plate 530, the first sensing module 540, and the second sensing module 550 are positioned within an internal volume defined by the housing 502. The plate 530 may include a first opening 532 and a second opening 534. Also, the first sensing module 540 may include a detection region 542 aligned with the first opening 532, and the second sensing module 550 may include a detection region 552 aligned with the second opening 534.

As shown, the housing 502 may include a wall 508 that includes a first access port 514a, a second access port 514b, and a third access port 514c, with the plate 530 covering (internally), without sealing off, the first access port 514a, the second access port 514b, and the third access port 514c. These access ports may define through holes in the wall 508, similar to a manner previously described. Furthermore, at least some of these access ports may be positioned closer to the upper edge of the housing 502, with the "upper edge" referring to an edge of the housing 502 that is closer to a cover layer 504 than a region 522 that is proximate to (or in contact with) a user's appendage. For example, the first access port 514a and the second access port 514b may be positioned closer to, or biased toward, the upper edge of the housing 502. As a result, a center point of the first access port 514a is separated from a center point of the detection region 542 by a separation distance Db1, and a center point of the second access port 514*b* is separated from a center point of the detection region 552 by a separation distance Db2. As compared to the embodiment of the portable electronic device 100 shown in FIG. 3, the separation distances may be different in FIG. 9. For example, the separation distance Db1 may be greater than the separation distance Da1 (shown in FIG. 3), and the separation distance Db2 may be greater than the separation distance Da2 (shown in FIG. 3). This suggests that the access ports may be i) relatively closer to the upper edge of the housing 502 (or, an upper edge of the wall 508) and ii) further separated from their respective sensing modules. Accordingly, the manufacturer of the portable electronic device 500 can modify external features, such as the access ports, rather than internal components (e.g., the sensing modules, and the internal surfaces of a housing), which may decrease design and engineering changes.

Similar to the first access port 514*a* and the second access port 514*b*, the third access port 514*c* is disposed along the wall 508 and can be fluidly connected to the first sensing module 540 and the second sensing module 550 in order to facilitate equilibrating the pressure present within different regions of a flow pathway (defined in part by the plate 530, the first access port 514*a*, and the second access port 514*b*) and the ambient pressure. Also, the plate 530 includes an additional diagonal component (as compared to the plate 230 in FIG. 3) that extends to cover (internally), but does not seal off, the third access port 514*c*. The plate 530, the first access port 514*a*, the second access port 514*b*, and the third access port 514*c* may define, in part, a tortuous flow pathway within the portable electronic device 500, similar to a manner previously described. However, the third access port 514*c* and the additional diagonal component of the plate 530 may further define the tortuous flow pathway, as well as provide an additional inlet/outlet from the third access port 514*c*. Although the first access port 514*a*, the second access port 514*b*, and the third access port 514*c* are shown in particular locations, these access ports can be formed generally anywhere along the wall 508.

FIG. 10 illustrates a partial side view of an alternate embodiment of a portable electronic device 600, showing a wall 608 with a single access port, according to some embodiments. As shown, the portable electronic device 600 may include a housing 602 that includes a wall 608. The portable electronic device 600 may include a plate 630 that carries a first sensing module 640 and a second sensing module 650. The plate 630, the first sensing module 640, and the second sensing module 650 are positioned within an internal volume defined by the housing 602. The plate 630 may include a first opening 632 and a second opening 634. Also, the first sensing module 640 may include a detection region 642 aligned with the first opening 632, and the second sensing module 650 may include a detection region 652 aligned with the second opening 634.

The housing 602 may include an access port 614, which represents a single access port formed in the wall 608. As a result, the access port 614, the plate 630, and the openings in the plate 630 may define in part a tortuous path way to the first sensing module 640 and the second sensing module 650. In order to provide for a sufficient flow pathway to and from the first sensing module 640 and the second sensing module 650, the diameter of the access port 614 can be increased, as compared to diameters of access ports in prior embodiments. In this manner, the manufacture may limit the number of access ports, thereby reducing the number of locations vulnerable to unwanted ingress into a portable electronic device.

Furthermore, the access port 614 is separated from the first sensing module 640 by a separation distance Dc1, and the access port 614 is separated from the second sensing module 650 by a separation distance Dc2. The separation between the access port 614 and the sensing modules may be decreased relative to the separations distances between access ports and sensing modules in the portable electronic device 100 (shown in FIG. 2). However, the location of the first sensing module 640 and the second sensing module 650 may remain fixed. Beneficially, the manufacturer does not have to modify the internal architecture, i.e., re-position the location of the sensing modules, as yet a different modification—a single access port with an increased diameter—may be implemented. It should be noted that a shared volume can be maintained between the first sensing module 640 and the second sensing module 650 and separate flow pathways that connect both of the first sensing module 640 and the second sensing module 650 to the access port 614.

FIG. 11 illustrates a partial side view of an alternate embodiment of a portable electronic device 700, showing a plate that covers additional sensing modules, according to some embodiments. As shown, the portable electronic device 700 may include a housing 702 that includes a wall 708. The portable electronic device 700 may include a plate 730 that carries a first sensing module 740, a second sensing module 750, and a third module 760. The third module 760 may include features of any sensing module described herein. Accordingly, the third module 760 may define a third sensing module in the portable electronic device 700. Alternatively, in some embodiments, the third module 760 may include an acoustical module (e.g., speaker module). The plate 730, the first sensing module 740, the second sensing module 750, and the third module 760 are positioned within an internal volume defined by the housing 702. The plate 730 may include a first opening 732, a second opening 734, and a third opening 736. Also, the first sensing module 740 may include a detection region 742 aligned with the first opening 732, the second sensing module 750 may include a detection region 752 aligned with the second opening 734, and the third module 760 may include a detection region 762 (or alternatively, an operational region that includes a speaker diaphragm) aligned with the third opening 736.

The wall 708 includes a first access port 714*a* and a second access port 714*b*, with the plate 730 covering (internally), without sealing off, the first access port 714*a* and the second access port 714*b*. These access ports may define through holes in the wall 708, similar to a manner previously described. As a result, the first access port 714*a* and a second access port 714*b* and the plate 730 may define in part a tortuous path way to the first sensing module 740, the second sensing module 750, and the third module 760. In this regard, the first access port 714*a* and the second access port 714*b* may be fluidly connected to the first sensing module 740, the second sensing module 750, and the third module 760, thereby connecting the first sensing module 740, the second sensing module 750, and the third module 760 to the external environment (external to the portable electronic device 700). Although an additional, third module is shown in FIG. 11, it should be noted that any number of modules can be incorporated into the internal architecture of the portable electronic device 700. Also, a shared volume can be maintained between the first sensing module 740, the second sensing module 750, and the third module 760, with separate flow pathways that connect the first sensing module 740, the second sensing module 750, and the third module 760 to the first access port 714*a* and the second access port 714*b*.

Figure 12:
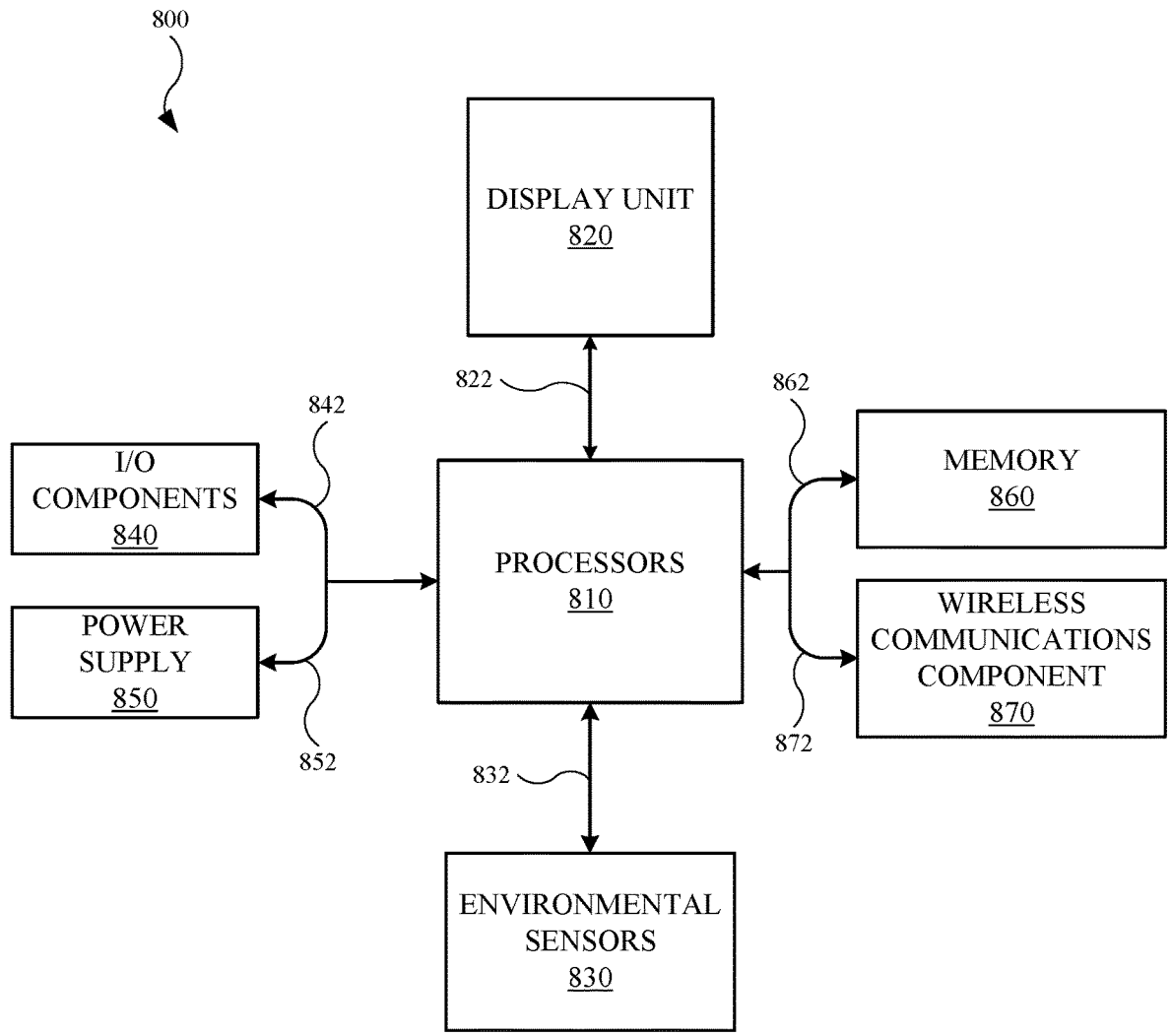
FIG. 12 illustrates a block diagram of a portable electronic device that can implement different aspects of the various techniques described herein, in accordance with some embodiments.

FIG. 12 illustrates a block diagram of a portable electronic device 800 that is capable of implementing the various techniques described herein, in accordance with some embodiments. The portable electronic device 800 may include any features described herein for a portable electronic device. In some embodiments, the portable electronic device 800 takes the form of the portable electronic device 100 (shown in FIG. 1). The portable electronic device 800 can include one or more processors 810 for executing functions of the portable electronic device 800. The one or more processors 810 can refer to at least one of a central processing unit (CPU) and at least one microcontroller for performing dedicated functions.

According to some embodiments, the portable electronic device 800 can include a display unit 820. The display unit 820 is capable of presenting a user interface that includes icons (representing software applications), textual images, and/or motion images. In some examples, each icon can be associated with a respective function that can be executed by the one or more processors 810. In some cases, the display unit 820 includes a display layer (not illustrated), which can include a liquid-crystal display (LCD), light-emitting diode display (LED), or the like. According to some embodiments, the display unit 820 includes a touch input detection component and/or a force detection component that can be configured to detect changes in an electrical parameter (e.g., electrical capacitance value) when the user's appendage (acting as a capacitor) comes into proximity with the display unit 820 (or in contact with a cover layer that covers the display unit 820). The display unit 820 is connected to the one or more processors 810 via one or more connection cables 822.

According to some embodiments, the portable electronic device 800 can include one or more environmental sensors 830 capable of detecting environmental conditions that are present within, or general proximate to, the portable electronic device 800. In some examples, the one or more environmental sensors 830 may include a humidity sensor, a temperature sensor, a liquid sensor, an ambient pressure sensor, underwater depth sensor, a magnetic field sensor, a strain gage, a capacitive sensor, a barometer, a microphone, and/or a thermometer. In some embodiments, the one or more environmental sensors 830 can determine whether the portable electronic device 800 is exposed to a specific environmental stimulus (e.g., moisture). In response, the one or more processors 810 can modify a notification that is presented by the display unit 820 that corresponds to the specific environmental stimulus. The one or more environmental sensors 830 is/are connected to the one or more processors 810 via one or more connection cables 832.

According to some embodiments, the portable electronic device 800 can include one or more input/output components 840 (also referred to as "I/O components") that enable communication between a user and the portable electronic device 800. In some cases, the one or more input/output components 840 can refer to a button or a switch that is capable of actuation by the user. In some cases, the one or more input/output components 840 can refer to a soft key that is flexibly programmable to invoke any number of functions. In some examples, the one or more input/output components 840 can refer to a switch having a mechanical actuator (e.g., spring-based switch, slide-switch, rocker switch, etc.) or other moving parts that enable the switch to be actuated by the user. In some examples, the one or more input/output components 840 can refer to a capacitive switch that is integrated with the display unit 820. When the one or more input/output components 840 are actuated, the input/output components 840 can generate an electrical signal that is provided to the one or more processors 810 via one or more connection cables 842.

According to some embodiments, the portable electronic device 800 can include a power supply 850 that is capable of providing energy to the operational components of the portable electronic device 800. In some examples, the power supply 850 can refer to a rechargeable battery. The power supply 850 can be connected to the one or more processors 810 via one or more connection cables 852. The power supply 850 can be directly connected to other devices of the portable electronic devices, such as the one or more input/output components 840. In some examples, the portable electronic device 800 can receive power from another power sources (e.g., another electronic device) not shown in FIG. 12.

According to some embodiments, the portable electronic device 800 can include memory 860, which can include a single disk or multiple disks (e.g., hard drives), and includes a storage management module that manages one or more partitions within the memory 860. In some cases, the memory 860 can include flash memory, semiconductor (solid state) memory or the like. The memory 860 can also include a Random Access Memory (RAM) and a Read-Only Memory (ROM). The ROM can store programs, utilities or processes to be executed in a non-volatile manner. The RAM can provide volatile data storage, and stores instructions related to the operation of the portable electronic device 800. In some embodiments, the memory 860 refers to a non-transitory computer readable medium, where an operating system (OS) is established at the memory 860 that can be configured to execute applications or software programs that are stored at the memory 860. In some embodiments, a data bus 862 can facilitate data transfer between the memory 860 and the one or more processors 810.

According to some embodiments, the portable electronic device 800 can include a wireless communications component 870. A network/bus interface 872 can couple the wireless communications component 870 to the one or more processors 810. The wireless communications component 870 can communicate with other electronic devices via any number of wireless communication protocols, including at least one of a global network (e.g., the Internet), a wide area network, a local area network, a wireless personal area network (WPAN), or the like. In some examples, the wireless communications component 870 can transmit data to the other electronic devices over IEEE 802.11 (e.g., a Wi-Fi® networking system), Bluetooth (IEEE 802.15.1), ZigBee, Wireless USB, Near-Field Communication (NFC), a cellular network system (e.g., a 3G/4G/5G network such as UMTS, LTE, etc.), or the like.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A wearable electronic device, comprising:
    a housing that defines an internal volume, the housing comprising a wall that includes a first access port and a second access port, wherein the first access port and the second access port open to the internal volume;
    a plate located in the internal volume;
    a first sensing module located in the internal volume, the first sensing module comprising a first detection region in communication with an environment that is external to the housing; and
    a second sensing module located in the internal volume, the second sensing module comprising a second detection region in communication with the external environment,
    wherein the first sensing module and the second sensing module are mounted to the plate such that i) the first detection region is offset with respect to the first access port and ii) the second detection region is offset with respect to the second access port.

2. The wearable electronic device of claim 1, further comprising a cover layer formed from a transparent material, wherein the wall comprises an edge region and wherein the first access port and the second access port are positioned closer to the cover layer than the edge region.

3. The wearable electronic device of claim 1, wherein the plate comprises:
    a first opening that receives the first sensing module, and
    a second opening that receives the second sensing module.

4. The wearable electronic device of claim 1, wherein the plate comprises:
    a first diagonal section;
    a second diagonal section connected to the first diagonal section, and
    a third diagonal section connected to the second diagonal section.

5. The wearable electronic device of claim 1, wherein the plate comprises a recess that at least partially receives the first sensing module and the second sensing module.

6. The wearable electronic device of claim 1, wherein the plate internally covers the first access port and the second access port without sealing off the first access port and the second access port.

7. The wearable electronic device of claim 1, wherein the first sensing module comprises an ambient pressure sensor, and wherein the second sensing module comprises a microphone.

8. The wearable electronic device of claim 1, further comprising:
    a cover layer coupled with the housing;
    a display unit covered by the cover layer;
    a first user-attachment feature coupled to the housing; and
    a second user-attachment feature coupled to the housing, the second user-attachment feature capable of coupling with the first user-attachment feature to couple the housing with a user.

9. A wearable electronic device, comprising:
    a housing that defines an internal volume, wherein the housing comprises a wall that includes a first access port and a second access port, the first access port and the second access port open to the internal volume; a first sensing module located in the internal volume, the first sensing module comprising a first detection region in a first offset position, in at least two dimensions, with respect to the first access port;
    a second sensing module located in the internal volume, the second sensing module comprising a second detection region in a second offset position, in at least two dimensions, with respect to the second access port; and
    a plate positioned in the internal volume between the wall and the first and second sensing modules, the plate comprising:
        a first opening aligned with the first detection region, and
        a second opening aligned with the second detection region, wherein the plate comprises at least two diagonal sections.

10. The wearable electronic device of claim 9, further comprising:
    a display unit; and
    a processor located in the internal volume and in communication with the first sensing module and the display unit, wherein when a stimulus is received by the first detection region, the stimulus causes the sensing module to provide a detection signal to the processor that causes the display unit to present a notification that corresponds to the stimulus.

11. The wearable electronic device of claim 9, wherein the two dimensions comprise:
    a first dimension; and
    a second direction perpendicular to the first dimension.

12. The wearable electronic device of claim 9, wherein: the plate covers the first access port and the second access port.

13. The wearable electronic device of claim 12, wherein the wall and plate define i) a first pathway to the first sensing module, and ii) a second pathway to the second sensing module.

14. A wearable electronic device, comprising:
    a housing that includes walls that defines an internal volume, the walls comprising a wall that includes a first access port and a second access port, wherein the first access port and the second access port open to the internal volume;
    an ambient pressure sensor located in the internal volume, the ambient pressure sensor comprising a first detection region that is capable of measuring ambient pressure of an environment external to the housing,
    a microphone located in the internal volume, the microphone comprising a second detection region that is capable of detecting acoustical energy received from the external environment, and
    a plate positioned in the internal volume, the plate comprising:
        a first opening aligned with the first detection region, and
        a second opening aligned with the second detection region, wherein the wall and the plate define a pathway for a stimulus from the environment external to the first detection region and the second detection region, wherein the ambient pressure sensor and the microphone are directly coupled to the plate.

15. The wearable electronic device of claim 14, wherein the first detection region lacks a concentric configuration with respect to the first access port, and wherein the second detection region lacks a concentric configuration with respect to the second access port.

16. The wearable electronic device of claim 14, further comprising a cover layer coupled with the housing, wherein the wall defines an edge region, and wherein the first access port and the second access port are closer to the cover layer than the edge region.

17. The wearable electronic device of claim 16, further comprising:

a display unit that is capable of present visual information, the display unit covered the cover layer;

a processor located in the internal volume, the processor in communication with the ambient pressure sensor, the display unit, and the microphone, wherein the processor is capable of providing sensory feedback to alter the display unit in response to receiving a detection signal from the ambient pressure sensor or the microphone.

18. The wearable electronic device of claim 14, wherein the plate comprises at least two diagonal sections.

19. The wearable electronic device of claim 14, wherein the plate is positioned between the wall and at least one of the ambient pressure sensor or the microphone.

20. The wearable electronic device of claim 1, wherein the first sensing module and the second sensing module are directly coupled to the plate.

* * * * *

UNITED STATES PATENT AND TRADEMARK OFFICE
CERTIFICATE OF CORRECTION

PATENT NO. : 10,599,192 B2
APPLICATION NO. : 15/976768
DATED : March 24, 2020
INVENTOR(S) : Amin M. Younes et al.

Page 1 of 1

It is certified that error appears in the above-identified patent and that said Letters Patent is hereby corrected as shown below:

In the Claims

In Claim 13, at Column 24, Line 45: "the wall and plate define i) a first pathway to the first sensing" should read -- the wall and the plate define i) a first pathway to the first sensing --.

Signed and Sealed this
Thirteenth Day of September, 2022

Katherine Kelly Vidal
*Director of the United States Patent and Trademark Office*